United States Patent
Kijima et al.

(10) Patent No.: US 8,967,828 B2
(45) Date of Patent: Mar. 3, 2015

(54) LIGHT SOURCE APPARATUS

(71) Applicants: Takumi Kijima, Tokyo (JP); Koji Kumano, Tokyo (JP); Yukio Sato, Tokyo (JP); Mitoru Yabe, Tokyo (JP)

(72) Inventors: Takumi Kijima, Tokyo (JP); Koji Kumano, Tokyo (JP); Yukio Sato, Tokyo (JP); Mitoru Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 173 days.

(21) Appl. No.: 13/692,642

(22) Filed: Dec. 3, 2012

(65) Prior Publication Data

US 2013/0176730 A1  Jul. 11, 2013

(30) Foreign Application Priority Data

Jan. 5, 2012  (JP) .................................. 2012-000403

(51) Int. Cl.
*F21V 21/00* (2006.01)
*F21V 29/00* (2006.01)
*G03B 21/16* (2006.01)
*G03B 21/20* (2006.01)

(52) U.S. Cl.
CPC .............. *F21V 29/004* (2013.01); *G03B 21/16* (2013.01); *G03B 21/2033* (2013.01)
USPC ................................ 362/249.02; 362/249.01

(58) Field of Classification Search
CPC ....................................................... G03B 21/16
USPC ................. 362/373, 218, 547, 612, 555, 546, 362/249.02, 249.01
See application file for complete search history.

(56) References Cited

U.S. PATENT DOCUMENTS

| 2005/0141993 | A1 | 6/2005 | Hung |
| 2006/0274282 | A1 | 12/2006 | Hsu et al. |
| 2011/0181842 | A1 | 7/2011 | Kanno et al. |

FOREIGN PATENT DOCUMENTS

| CN | 102155682 A | 8/2011 |
| JP | 10-281506 A | 10/1998 |
| JP | 2001-015968 A | 1/2001 |
| JP | 3406074 B2 | 5/2003 |
| JP | 2011-154855 A | 8/2011 |
| WO | WO 2009/039715 A1 | 4/2009 |

*Primary Examiner* — Vip Patel
(74) *Attorney, Agent, or Firm* — Birch, Stewart, Kolasch & Birch, LLP

(57) ABSTRACT

A light source apparatus includes an outer casing. A light source member and a light source module having a cooling body which cools the light source member are disposed in the outer casing. A wind tunnel which surrounds a heat pipe unit as the cooling body of the light source module is provided in the outer casing. The wind tunnel includes a wind passage which allows cooling wind to pass through the heat pipe unit. An intake-opening is formed in a surface of the outer casing, and cooling wind is taken into the outer casing from outside thereof through the intake-opening. One end of the wind passage of the wind tunnel is connected to the intake-opening.

12 Claims, 19 Drawing Sheets

F I G . 2 0
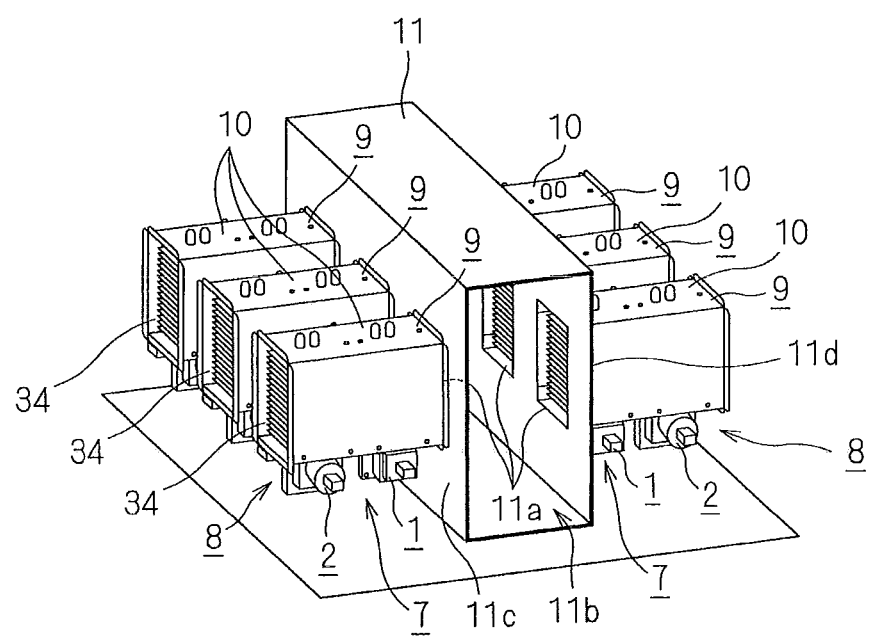

US 8,967,828 B2

LIGHT SOURCE APPARATUS

BACKGROUND OF THE INVENTION

1. Field of the Invention

The present invention relates to a light source apparatus.

2. Description of the Background Art

Conventionally, there is proposed various techniques concerning a light source apparatus. For example, Japanese Patent Application Laid-Open No. 2011-154855 describes a light source apparatus used for a projection video display system.

Japanese Patent Application Laid-Open No. 2001-15968 describes a technique concerning a cooling device provided in electronic equipment. Japanese Patent Application Laid-Open No. 10-281506 (1998) describes a technique concerning a humidifier. Japanese Patent Publication No. 3406074 describes a technique concerning a chassis frame for an electric car.

If light from a light source provided in a light source apparatus leaks outside of the light source apparatus, this adversely affects peripheries in some cases.

SUMMARY OF THE INVENTION

It is an object of the present invention to provide a technique capable of restraining light from leaking outside of the light source apparatus.

A light source apparatus according to one embodiment of the present invention includes: an outer casing; at least one light source module which is disposed in the outer casing and which includes a light source member and a cooling body for cooling the light source member; and a wind tunnel which is disposed in the outer casing, which surrounds the cooling body of the at least one light source module, and which includes a first wind passage which allows cooling wind to pass through the cooling body of the at least one light source module. An intake-opening through which cooling wind is taken into the outer casing from outside thereof is formed in a surface of the outer casing. One end of the first wind passage of the wind tunnel is connected to the intake-opening.

According to the light source apparatus, it is possible to restrain light from leaking outside of the light source apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a diagram showing a state where a plurality of light source unit sets are mounted on a duct;

DESCRIPTION OF THE PREFERRED EMBODIMENTS

Figure 1:
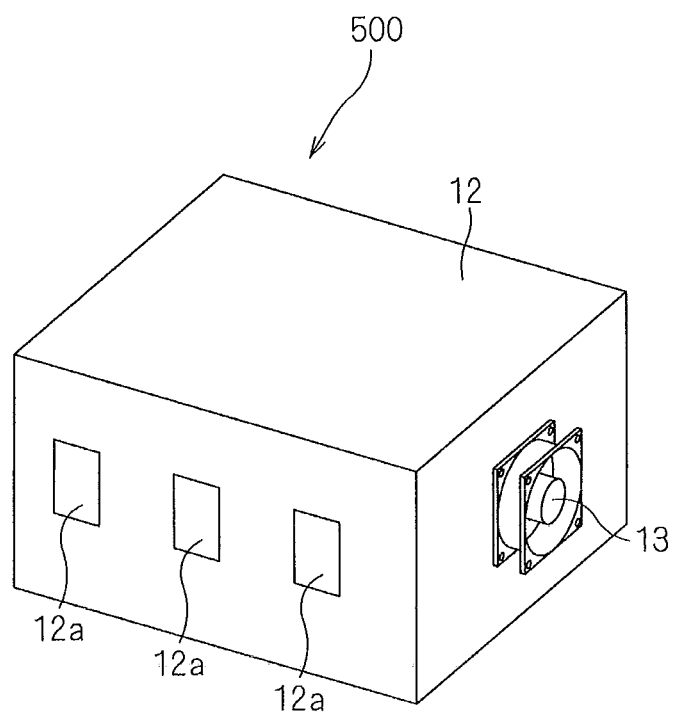
FIG. 1 is a perspective view showing a structure of a light source apparatus.

FIG. 1 is a perspective view showing an outward appearance of a light source apparatus 500 of a preferred embodiment. The light source apparatus 500 includes an outer casing 12 having a rectangular parallelepiped shape for example, in which a plurality of light source modules are accommodated. Three intake-openings 12a are formed in each of mutually opposed two side surfaces of the outer casing 12, and cooling wind is taken into the outer casing 12 from outside thereof through the intake-openings 12a. A cooling fan 13 is mounted on the outer casing 12. If the cooling fan 13 rotates, air existing outside of the outer casing 12 is taken into the outer casing 12 as cooling wind from the plurality of intake-openings 12a. The cooling wind taken into the outer casing 12 cools the plurality of light source modules provided in the outer casing 12, and is discharged outside of the outer casing 12. An interior of the outer casing 12 will be described in detail later.

Figure 2:
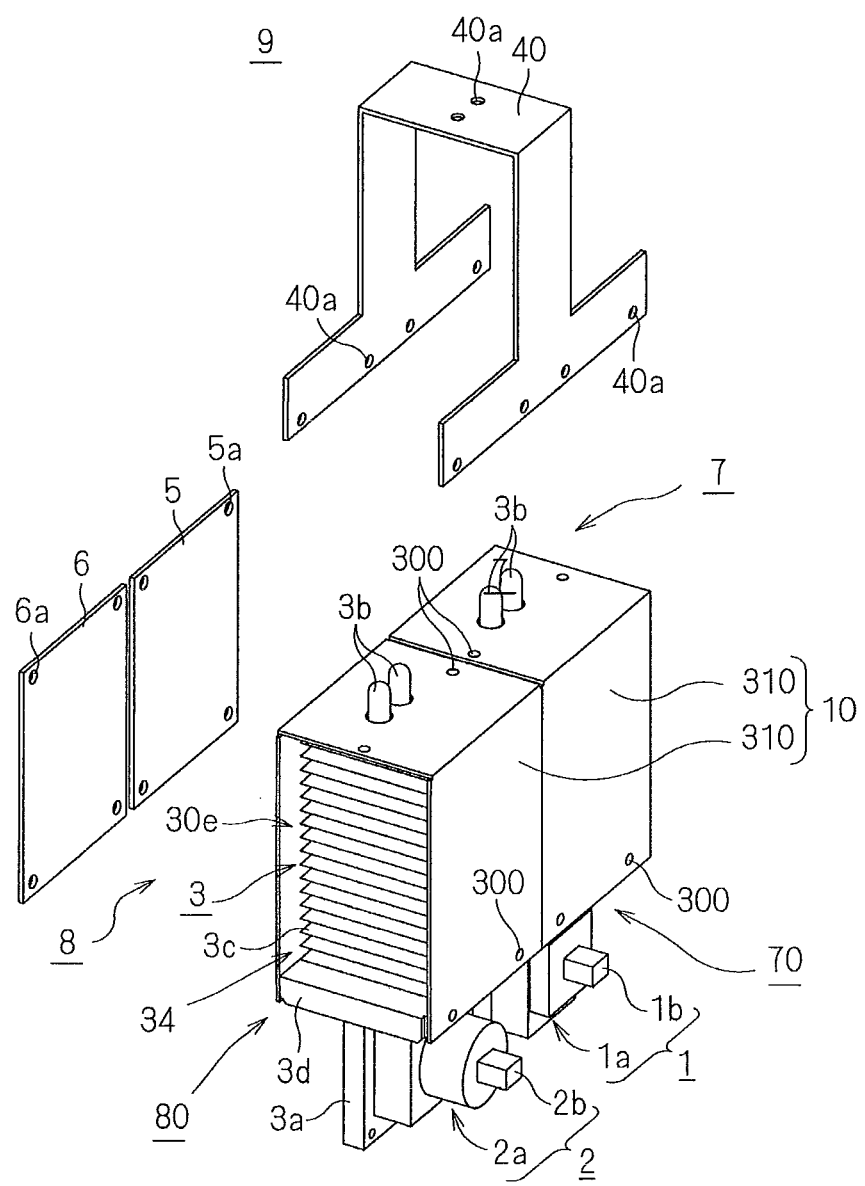
FIG. 2 is an exploded perspective view showing a structure of a light source unit set.
Figure 3:
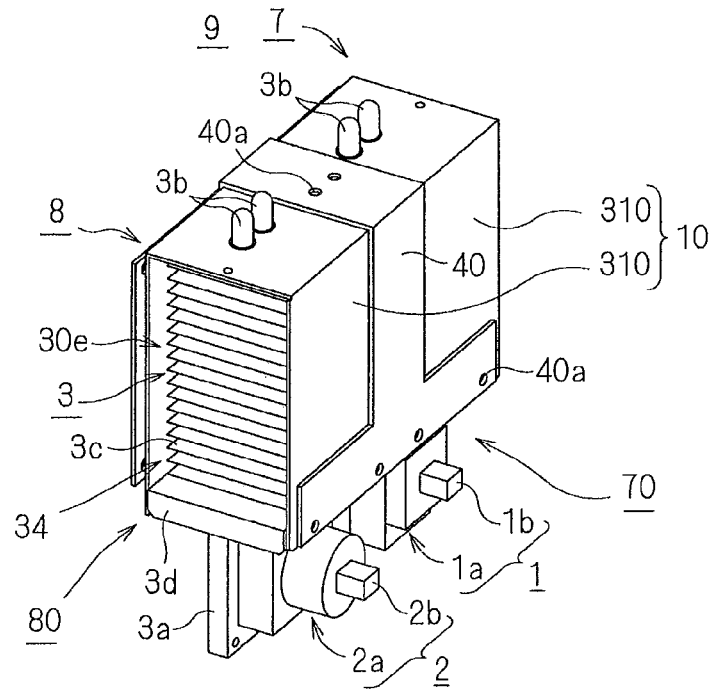
FIGS. 3 and 4 are perspective views showing the structure of the light source unit set.
Figure 4:
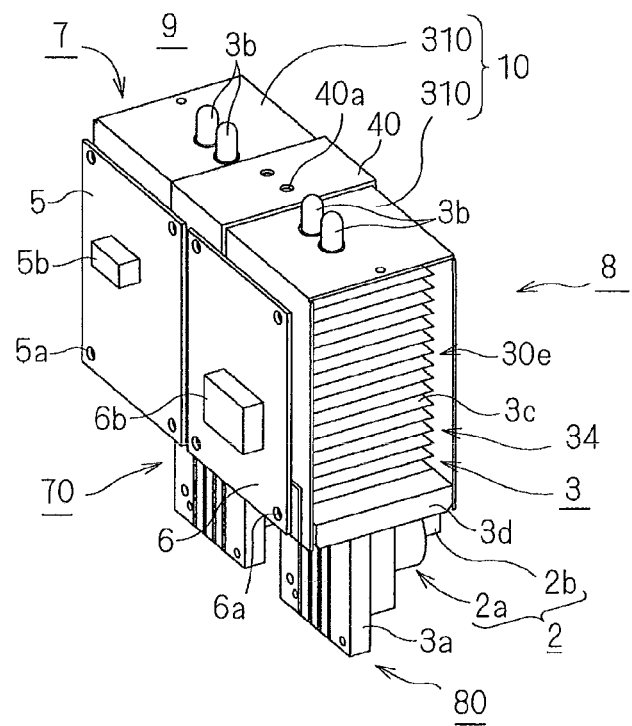
Figure 5:
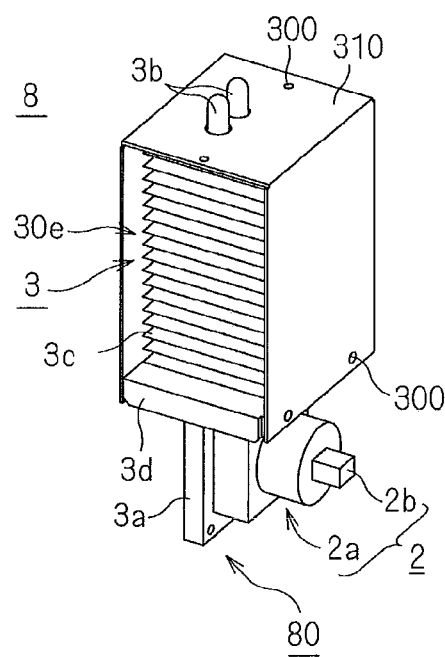
FIGS. 5 and 6 are perspective views showing a structure of a second light source unit.
Figure 6:
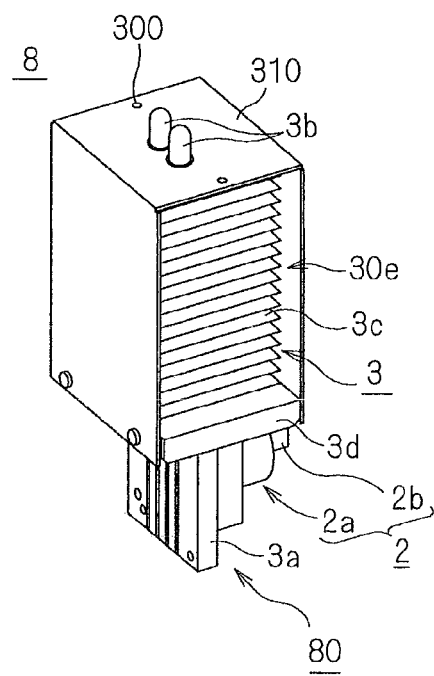

Next, the light source modules accommodated in the outer casing 12 will be described. In the preferred embodiment, two light source units respectively including the light source modules are connected to each other to form a light source unit set 9, and the light source unit set 9 is accommodated in the outer casing 12. FIG. 2 is an exploded perspective view showing a structure of the light source unit set 9. FIGS. 3 and 4 are perspective views showing the structure of the light source unit set 9. FIGS. 5 and 6 are perspective views showing a structure of a second light source unit 8 possessed by the light source unit set 9.

As shown in FIGS. 2 to 4, the light source unit set 9 includes a first light source unit 7, the second light source unit 8 which is abreast of the first light source unit 7, and a connection member 40 which connects the first and second light source units to each other.

The first light source unit 7 includes a first light source module 70 and a first drive substrate 5. The second light source unit 8 includes a second light source module 80 and a second drive substrate 6. The first light source unit 7 and the second light source unit 8 respectively include wind tunnel portions 310 forming portions of the wind tunnel 10 which constitutes a wind passage 34 which allows cooling wind to pass through the light source unit set 9.

The first light source module 70 includes a first light source member 1 which outputs red laser for example, and the second light source module 80 includes a second light source member 2 which outputs green laser for example. The first light source module 70 and the second light source module 80 respectively include metal heat pipe units 3 which function as cooling bodies. A drive circuit which drives the first light source member 1 is formed on the first drive substrate 5, and a drive circuit which drives the second light source member 2 is formed on the second drive substrate 6.

The first light source member 1 includes a first light source main body 1a having a light-emitting element which emits red light for example, and a first light source tip end 1b which outputs the red light produced by the first light source main body 1a. The light-emitting element possessed by the first light source main body 1a is a laser element for example. The light-emitting element may be a light-emitting diode. An optical fiber and others are mounted on the first light source tip end 1b.

The second light source member 2 includes a second light source main body 2a having a light-emitting element which emits green light for example, and a second light source tip end 2b which outputs the green light produced by the second light source main body 2a. The light-emitting element possessed by the second light source main body 2a is a laser element for example. The light-emitting element may be a light-emitting diode. An optical fiber and others are mounted on the second light source tip end 2b.

The first light source member 1 and the second light source member 2 are arranged side by side in a direction in which the first light source unit 7 and the second light source unit 8 are arranged side by side. In the following description, a front surface of the light source unit set 9 means a side on which the first light source member 1 and the second light source member 2 exist. The first light source unit 7 exists on the right side of the light source unit set 9 shown in FIGS. 3 and 4 as viewed from front, and the second light source unit 8 exists on the left side of the light source unit set 9 as viewed from front. Further, "right side" of the light source unit set 9 means a right side when the light source unit set 9 is viewed from front, and "left side" of the light source unit set 9 means a left side when the light source unit set 9 is viewed from front.

According to the first light source module 70, the heat pipe unit 3 is in contact with the first light source member 1, absorbs heat generated by the first light source member 1, and cools the first light source member 1. Similarly, according to the second light source module 80, the heat pipe unit 3 is in contact with the second light source member 2, absorbs heat generated by the second light source member 2, and cools the second light source member 2. The heat pipe unit 3 of the first light source module 70 and the heat pipe unit 3 of the second light source module 80 have the same structures.

The heat pipe unit 3 includes one heat block 3a, at least one heat pipe 3b, a plurality of fins 3c, and a bottom plate 3d which divides the heat block 3a and the plurality of fins 3c from each other. The heat pipe unit 3 of the preferred embodiment is provided with two heat pipes 3b for example.

The heat block 3a stands on a bottom surface of the bottom plate 3d, and one of main surfaces of the heat block 3a is in contact with a device which is to be cooled. In the first light source module 70, the main surface of the heat block 3a is in contact with the first light source main body 1a of the first light source member 1. In the second light source module 80, the main surface of the heat block 3a is in contact with the second light source main body 2a of the second light source member 2. The plurality of fins 3c are arranged in a row in the vertical direction such that the fins 3c are opposed to one another above the bottom plates 3d. The two heat pipes 3b penetrate the plurality of fins 3c and are connected to the bottom plate 3d.

Wind tunnel portions 310 are mounted on the heat pipe units 3 of the first light source module 70 and the second light source module 80. The wind tunnel portion 310 possessed by the first light source unit 7 and the wind tunnel portion 310 possessed by second light source unit 8 have the same structures.

The wind tunnel portion 310 constitutes a wind passage 30e which allows cooling wind to pass through the heat pipe unit 3. The wind tunnel portion 310 is a substantially U-shaped plate member, and surrounds sides and upper portions of the plurality of fins 3c. According to this configuration, the plurality of fins 3c are disposed in the wind passage 30e. Tip ends of the two heat pipes 3b project from an upper plate portion of the wind tunnel portion 310.

In each of the first light source unit 7 and the second light source unit 8, two opening surfaces of both ends of the wind passage 30e constituted by the wind tunnel portion 310 are opposed to each other in the direction in which the first light source unit 7 and the second light source unit 8 are arranged side by side. The wind tunnel portion 310 of the first light source unit 7 and the wind tunnel portion 310 of the second light source unit 8 adjoin to each other such that peripheral edges of one ends of the wind passages 30e thereof are connected to each other. According to this configuration, the wind passage 30e of the first light source module 70 and the wind passage 30e of the second light source unit 8 are connected to each other, and the one wind passage 34 possessed by the light source unit set 9 is constituted by the two wind passages 30e. The wind passage 34 allows cooling wind to pass through the cooling body formed from the two heat pipe units 3. The wind tunnel 10 of the light source unit set 9 including the wind passage 34 is constituted by the wind tunnel portion 310 of the first light source unit 7 and the wind tunnel portion 310 of the second light source unit 8. In the preferred embodiment, a plurality of fins 3c of the first light source unit 7 and the plurality of fins 3c of the second light source unit 8 are disposed in the wind passage 34 constituted by the wind tunnel 10 of the light source unit set 9, and cooling wind passes through the fins 3c.

The connection member 40 which connects the first light source unit 7 and the second light source unit 8 to each other is a substantially U-shaped plate member, and the connection member 40 is mounted on the first light source unit 7 and the second light source unit 8 such that the connection member 40 is astride the first light source unit 7 and the second light source unit 8. According to this configuration, the first light source module 70 and the second light source module 80 are connected to each other through the connection member 40.

The upper plate portion of the connection member 40 is mounted such that the upper plate portion is astride an upper plate portion of the wind tunnel portion 310 of the first light source unit 7 and an upper plate portion of the wind tunnel portion 310 of the second light source unit 8. One of the side plate portions of the connection member 40 is mounted such that it is astride one of the side plate portions of the wind tunnel portion 310 of the first light source unit 7 and one of the side plate portions of the wind tunnel portion 310 of the second light source unit 8. The other side plate portion of the connection member 40 is mounted such that it is astride the other side plate portion of the wind tunnel portion 310 of the first light source unit 7 and the other side plate portion of the wind tunnel portion 310 of the second light source unit 8. Screw holes 40*a* are formed in the connection member 40, and screw holes 300 are formed in the wind tunnel portions 310 of the first light source unit 7 and the second light source unit 8. By threadedly inserting screws into the screw holes 40*a* and 300, the connection member 40 is mounted on the wind tunnel portions 310 of the first light source unit 7 and the second light source unit 8.

An electronic part 5*b* (see FIG. 4) constituting the drive circuit which drives the first light source member 1 is mounted on the first drive substrate 5. An electronic part 6*b* (see FIG. 4) constituting the drive circuit which drives the second light source member 2 is mounted on the second drive substrate 6. The first drive substrate 5 is mounted on the connection member 40 and the wind tunnel portion 310 of the first light source unit 7 such that the first drive substrate 5 is astride the connection member 40 and the wind tunnel portion 310, and the second drive substrate 6 is mounted on the connection member 40 and the wind tunnel portion 310 of the second light source unit 8 such that the second drive substrate 6 is astride the connection member 40 and the wind tunnel portion 310.

The first drive substrate 5 is provided with screw holes 5*a*. By threadedly inserting screws into the screw holes 5*a* of the first drive substrate 5 and the screw holes 300 of the wind tunnel portion 310 of the first light source unit 7, the first drive substrate 5 is mounted on the wind tunnel portion 310 of the first light source unit 7. By threadedly inserting screws into the screw holes 5*a* of the first drive substrate 5 and the screw holes 40*a* of the connection member 40, the first drive substrate 5 is mounted on the connection member 40.

Similarly, the second drive substrate 6 is provided with screw holes 6*a*. By threadedly inserting screws into the screw holes 6*a* of the second drive substrate 6 and the screw holes 300 of the wind tunnel portion 310 of the second light source unit 8, the second drive substrate 6 is mounted on the wind tunnel portion 310 of the second light source unit 8. By threadedly inserting screws into the screw holes 6*a* of the second drive substrate 6 and the screw holes 40*a* of the connection member 40, the second drive substrate 6 is mounted on the connection member 40.

In this preferred embodiment, there is prepared a plurality of light source unit sets 9 having the above-described structure. The plurality of prepared light source unit sets 9 are disposed in the outer casing 12. As will be described later, in the outer casing 12, the plurality of light source unit sets 9 are mounted on a duct 11 (see later-described FIGS. 19 and 20). When the light source unit sets 9 are mounted on the duct 11, gaps are prone to be generated between the duct 11 and wind tunnels 10 of the light source unit sets 9, and cooling wind passing through the wind passages 34 of the wind tunnels 10 is prone to leak outside.

Figure 7:
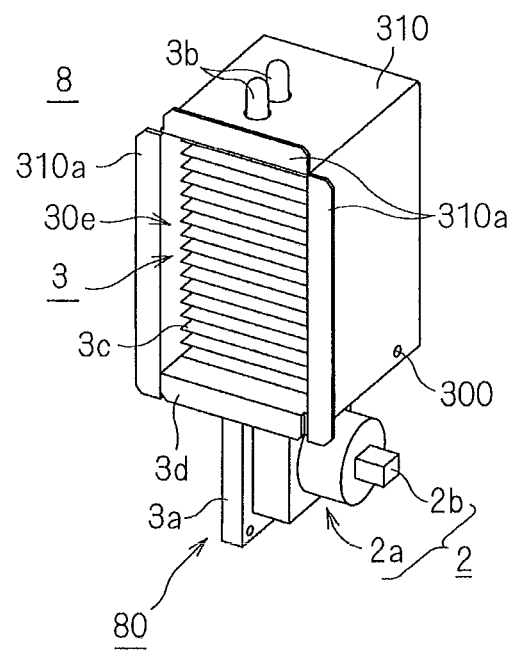
FIG. 7 is a diagram showing a state where the second light source unit is provided with a flange portion.
Figure 8:
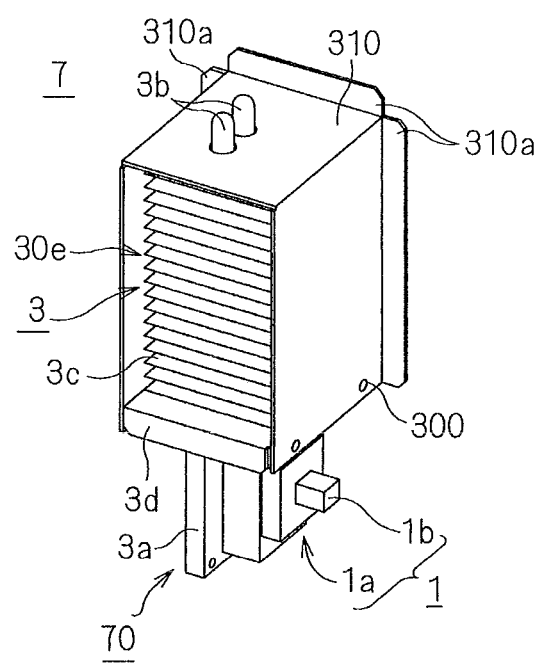
FIG. 8 is a diagram showing a state where a first light source unit is provided with a flange portion.
Figure 9:
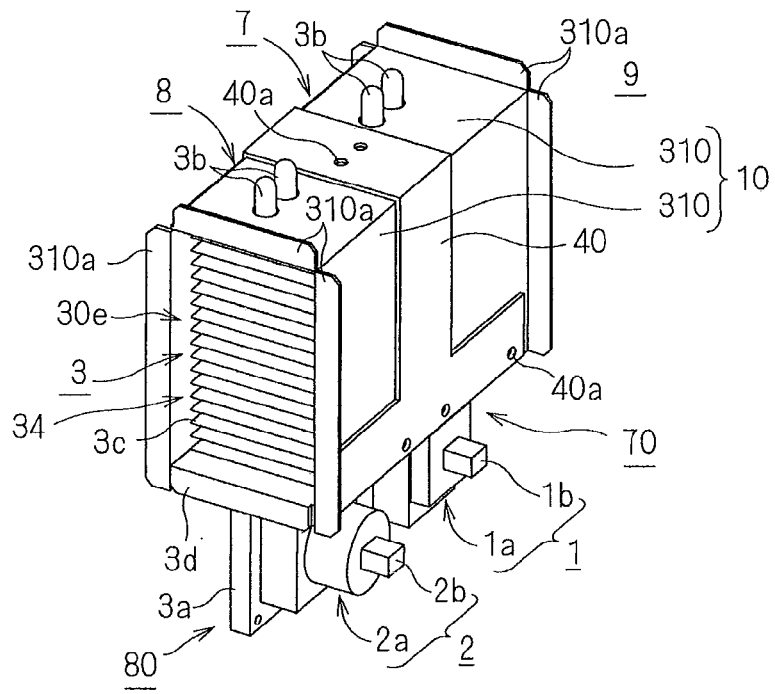
FIGS. 9 and 10 are perspective views showing a structure of a flanged light source unit set.
Figure 10:
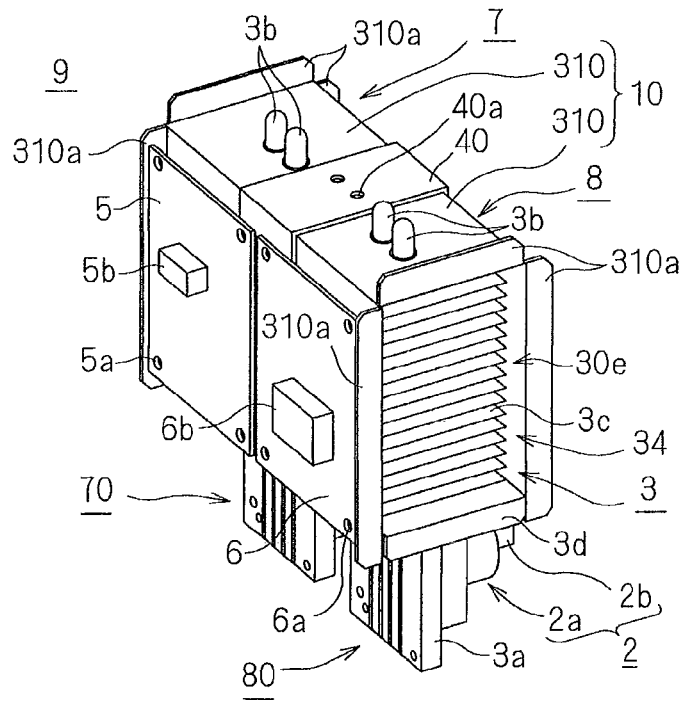

To prevent cooling wind from leaking, as shown in FIGS. 7 to 10, flange portion 310*a* may be provided on a peripheral edge of one end opening of the wind tunnel portion 310 in each of the first light source unit 7 and the second light source unit 8, i.e., on a peripheral edge of one end of the wind passage 30*e*. FIG. 7 is a perspective view showing the second light source unit 8 in which the flange portions 310*a* are provided on the peripheral edge of the one end opening of the wind tunnel portion 310, and FIG. 8 is a perspective view showing the first light source unit 7 in which the flange portions 310*a* are provided on the peripheral edge of the one end opening of the wind tunnel portion 310. FIGS. 9 and 10 are perspective views each showing the light source unit set 9 formed by connecting the first light source unit 7 and the second light source unit 8 to each other through the connection member 40. Hereinafter, when the light source unit set 9 shown in FIGS. 3 and 4 and the light source unit set 9 shown in FIGS. 9 and 10 are distinguished from each other, the former one is called "non-flanged light source unit set 9" and the latter one is called "flanged light source unit set 9" in some cases.

Flange portions 130*a* are provided on a peripheral edge of the right end opening of the wind tunnel portion 310 of the first light source unit 7 of the flanged light source unit set 9. Flange portions 130*a* are provided on a peripheral edge of the left end opening of the wind tunnel portion 310 of the second light source unit 8 of the flanged light source unit set 9. According to this configuration, the flange portions 130*a* are provided on the peripheral edges of the both end openings of the wind tunnel 10 of the flanged light source unit set 9. In other words, the wind tunnel 10 includes the flange portions 310*a* at the both end peripheral edges of the wind passages 34.

According to the flanged light source unit set 9, the flange portions 310*a* are provided on the peripheral edge of the right end opening of the wind tunnel 10. Therefore, if the duct 11 is mounted on the flanged light source unit set 9 from the side of the right end opening of the wind tunnel 10, a contact area between the wind tunnel 10 and the duct 11 is increased, and a gap is less prone to be generated therebetween. Hence, cooling wind passing through the wind passage 34 of the wind tunnel 10 is less prone to leak outside.

According to the flanged light source unit set 9, the flange portions 310*a* are provided also on the peripheral edge of the left end opening of the wind tunnel 10. Therefore, even if the duct 11 is mounted on the flanged light source unit set 9 from the side of the left end opening of the wind tunnel 10, a gap is less prone to be generated between the wind tunnel 10 and the duct 11, and cooling wind passing through the wind passage 34 is less prone to leak outside.

As described above, according to the light source unit set 9 (flanged light source unit set 9 and non-flanged light source unit set 9), the first light source unit 7 and the second light source unit 8 are integrally formed together by the connection member 40. Therefore, when a maintenance operation is carried out, the first light source unit 7 and the second light source unit 8 disposed in the outer casing 12 can integrally be detached. Therefore, the maintenance operation becomes easy.

In the light source unit set 9, the connection member 40 is mounted on the wind tunnel 10. Therefore, a portion of the light source unit set 9 where the connection member 40 is mounted on the first light source unit 7 and the second light source unit 8 is of a double structure including the connection member 40 and the wind tunnel 10, and material efficiency of using parts is deteriorated by this double structure.

Further, according to the flanged light source unit set 9, the flange portion 310*a* is provided on the right end of the wind tunnel portion 310 of the first light source unit 7, and the flange portion 310*a* is provided on the left end of the wind tunnel portion 310 of the second light source unit 8. Therefore, structures of the wind tunnel portions 310 of the first light source unit 7 and the second light source unit 8 are different from each other. As a result, the number of kinds of using parts is increased.

Figure 11:
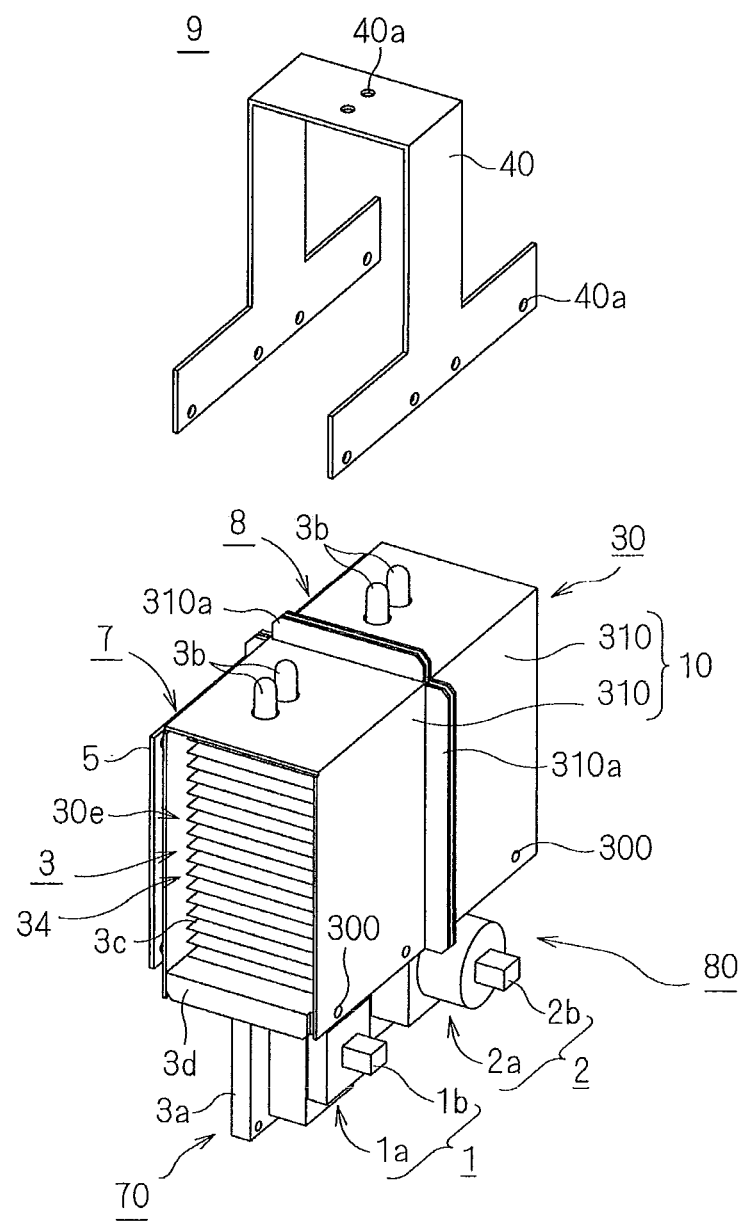
FIG. 11 is a diagram showing a state where positions of the first light source unit and the second light source unit in the flanged light source unit set are reversed.

If positions of the first light source unit 7 and the second light source unit 8 are reversed in the flanged light source unit set 9, the flange portion 310*a* of the wind tunnel portion 310 of the first light source unit 7 and the flange portion 310*a* of the wind tunnel portion 310 of the second light source unit 8 exist around the central portion of the second light source unit set 9 instead of its both ends as shown in FIG. 11, and the flange portions 310a are not disposed at originally required positions. Further, when the first light source unit 7 and the second light source unit 8 are connected to each other through the connection member 40, the connection member 40 interferes with the flange portions 310a at the central portion of the flanged light source unit set 9, and it becomes difficult to mount the connection member 40 on the first light source unit 7 and the second light source unit 8. Therefore, according to the flanged light source unit set 9, it is not easy to reverse the positions of the first light source unit 7 and the second light source unit 8 and to use the light source units 7 and 8.

As shown in FIGS. 4 and 10, according to the light source unit set 9, the first drive substrate 5 and the second drive substrate 6 are mounted on both the connection member 40 and the wind tunnel portions 310. Therefore, after the wind tunnel portion 310 of the first light source unit 7 and the wind tunnel portion 310 of the second light source unit 8 are connected to each other through the connection member 40, the first drive substrate 5 and the second drive substrate 6 are mounted on the wind tunnel portions 310. Hence, it is difficult to mount the first drive substrate 5 only on the wind tunnel portion 310 of the first light source unit 7 and to mount the second drive substrate 6 only on the wind tunnel portion 310 of the second light source unit 8. Hence, it becomes difficult to check operation of the first light source unit 7 alone, and to check operation of the second light source unit 8 alone. This is not preferable in terms of manufacture and services.

As described above, the light source unit set 9 has various points which must be improved. Hence, an improved structure of the light source unit set 9 will be described below. In the following description, to distinguish the light source unit set 9 and an improved light source unit set 9 which will be described below, the former one is called "pre-improved light source unit set 9" and the latter one is called "improved light source unit set 9".

<Structure of Improved Light Source Unit Set>

Figure 12:
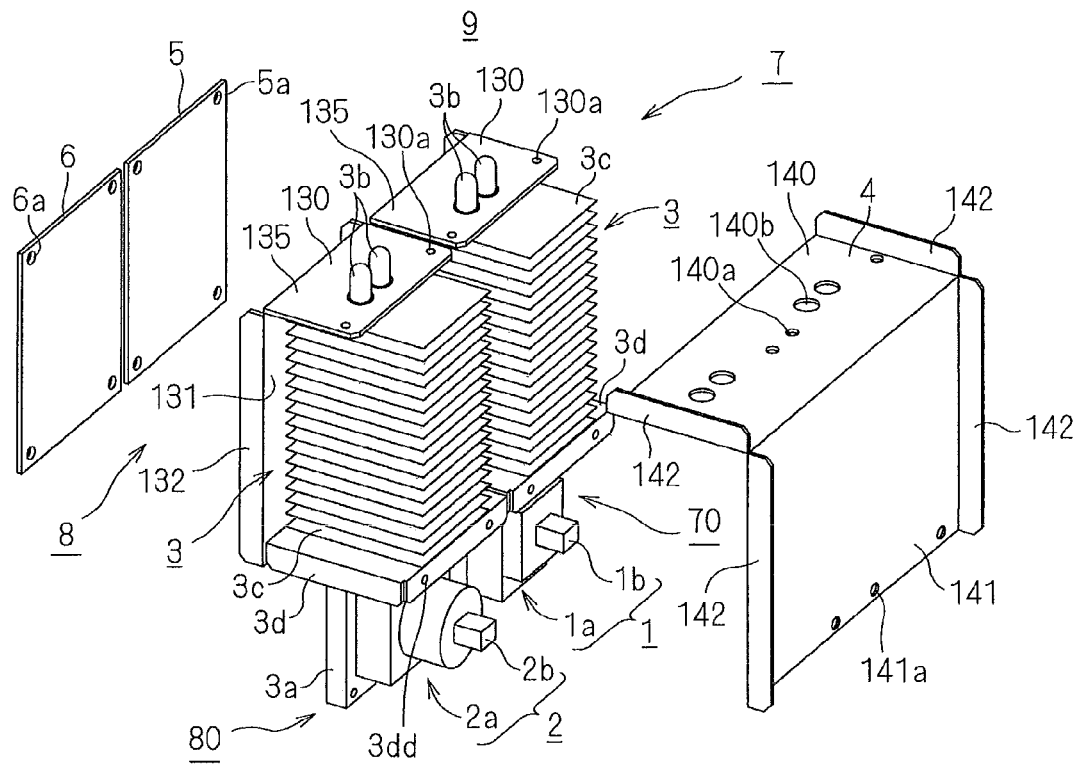
FIG. 12 is an exploded perspective view showing a structure of an improved light source unit set.
Figure 13:
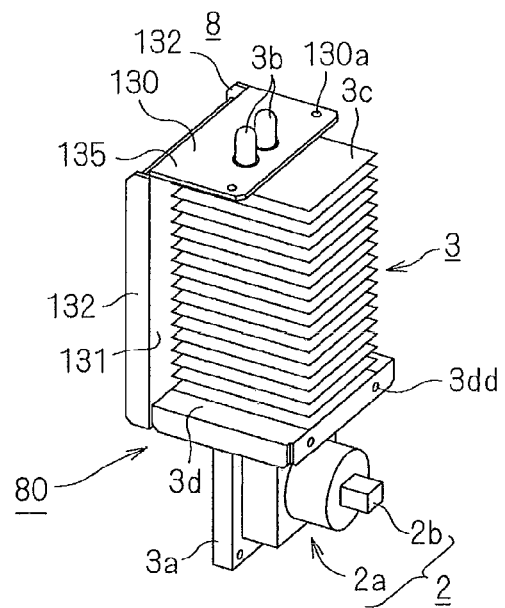
FIGS. 13 and 14 are perspective views showing a structure of a second light source unit of the improved light source unit set.
Figure 14:
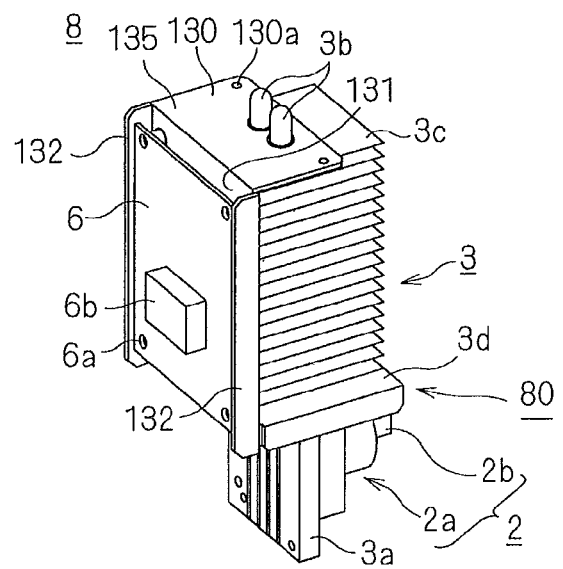
Figure 15:
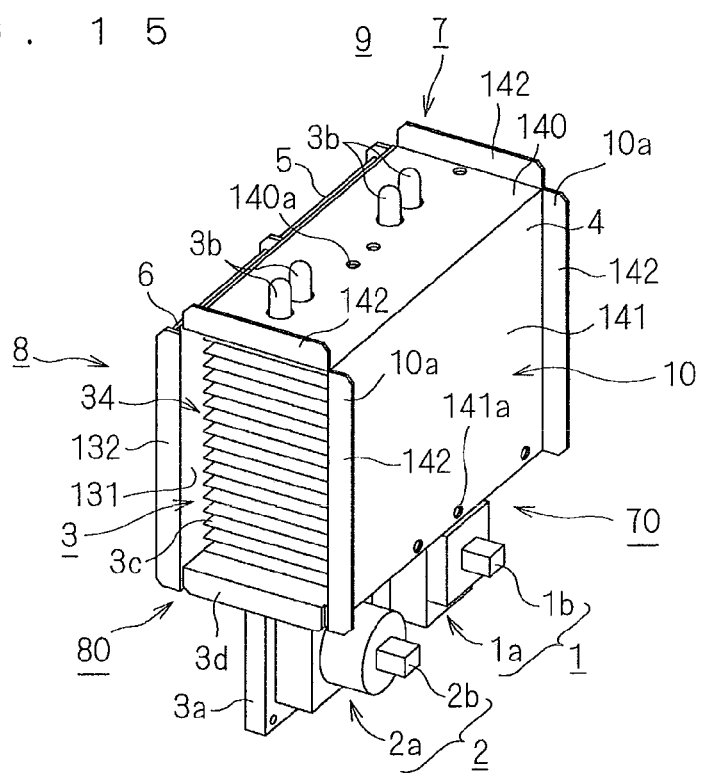
FIGS. 15 and 16 are perspective views showing a structure of the improved light source unit set.
Figure 16:
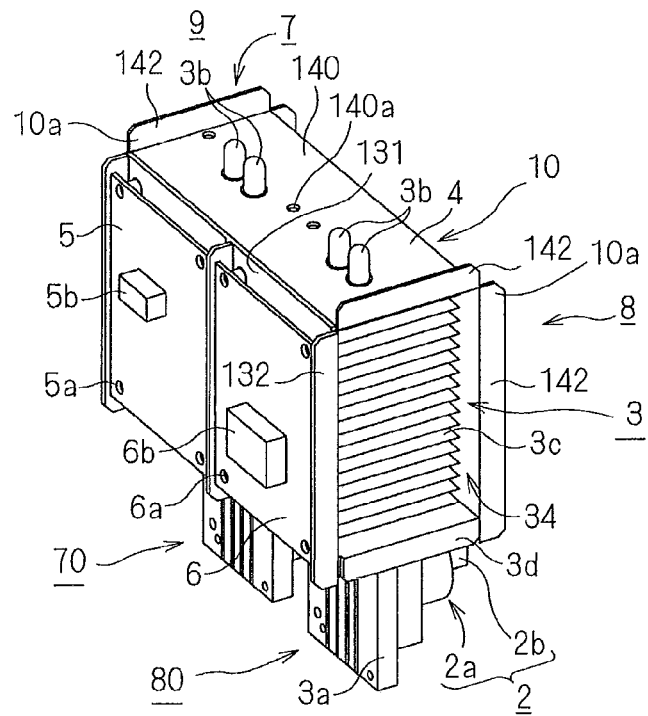

FIG. 12 is an exploded perspective view showing a structure of the improved light source unit set 9. FIGS. 13 and 14 are perspective views showing a structure of the second light source unit 8 possessed by the improved light source unit set 9. FIGS. 15 and 16 are perspective views showing a structure of the improved light source unit set 9. Differences of the improved light source unit set 9 with respect to the pre-improved light source unit set 9 will mainly be described below.

As shown in FIGS. 12 to 16, the improved light source unit set 9 includes the first light source unit 7, the second light source unit 8 which adjoins to the first light source unit 7, and the connection member 4 which connects the first light source unit 7 and the second light source unit 8 to each other. The first light source unit 7 includes the first light source module 70 and the first drive substrate 5 which are similar to those described above, and the second light source unit 8 includes the second light source module 80 and the second drive substrate 6 which are similar to those described above. The first light source unit 7 and the second light source unit 8 respectively include plate members 135 which constitute a portion of the wind tunnel 10 of the improved light source unit set 9. The wind tunnel 10 includes the wind passage 34 which allows cooling wind to pass through heat pipe units 3 of the first light source module 70 and the second light source module 80. In this preferred embodiment, the connection member 4 and the plate members 135 of the first light source unit 7 and the second light source unit 8 constitute the wind tunnel 10. In the first light source unit 7, the plate member 135 is mounted on the first light source module 70. In the second light source unit 8, the plate member 135 is mounted on the second light source module 80. The plate members 135 of the first light source unit 7 and the second light source unit 8 have the same structures.

Each of the plate members 135 has an L-shape, and includes a substantially square side plate portion 131 covering a side of the plurality of fins 3c, and a substantially square upper plate portion 130 partially covering the upper portion of the plurality of fins 3c. The upper plate portion 130 extends from an upper end of the side plate portion 131 perpendicular to the side plate portion 131, and covers about a half of an upper surface of each fin 3c. Tip ends of the two heat pipes 3b project upward from the upper plate portion 130.

Plate-like flange portions 132 are provided on both end surfaces in the side plate portions 131 of the plate members 135 in a direction in which the first light source unit 7 and the second light source unit 8 are arranged side by side such that the flange portions 132 are perpendicular to the side plate portions 131. The first light source unit 7 and the second light source unit 8 are arranged side by side such that the left flange portion 132 of the plate member 135 of the first light source unit 7 and the right flange portion 132 of the plate member 135 of the second light source unit 8 are in contact with each other.

The connection member 4 which connects the first light source unit 7 and the second light source unit 8 to each other is an L-shaped plate member, and the connection member 4 is mounted on the first light source unit 7 and the second light source unit 8 such that it is astride these light source units 7 and 8.

The connection member 4 includes a substantially square upper plate portion 140 completely covering the upper portion of the plurality of fins 3c, and a substantially square side plate portion 141 completely covering the side portion of the plurality of fins 3c. The side plate portion 141 is disposed such that it is opposed to the side plate portions 131 of the plate members 135 of the first light source unit 7 and the second light source unit 8. According to each of the first light source unit 7 and the second light source unit 8, the plurality of fins 3c are sandwiched between the side plate portions 131 of the plate members 135 and the side plate portion 141 of the connection member 4. The upper plate portion 140 extends from the upper end of the side plate portion 141 toward the side plate portions 131 of the plate members 135 of the first light source unit 7 and the second light source unit 8 perpendicularly to the side plate portion 141, and the upper plate portion 140 completely covers upper surfaces of the upper plate portions 130 of the plate members 135 of the first light source unit 7 and the second light source unit 8.

The upper plate portion 140 of the connection member 4 is mounted on the upper plate portion 130 of the plate member 135 of the first light source unit 7 and the upper plate portion 130 of the plate member 135 of the second light source unit 8 such that the upper plate portion 140 is astride these upper plate portions 130. A plurality of through holes 140b are formed in the upper plate portion 140, and tip ends of the plurality of heat pipes 3b of the first light source unit 7 and the second light source unit 8 are inserted into the plurality of through holes 140b. A plurality of screw holes 140a are formed in the upper plate portion 140, and a plurality of screw holes 130a are formed in each of the upper plate portions 130 of the first light source unit 7 and the second light source unit 8. By threadedly inserting screws into the screw holes 140a of the upper plate portion 140 and the screw holes 130a of the upper plate portions 130 of the first light source unit 7 and the second light source unit 8, the upper plate portion 140 is mounted on the upper plate portions 130 of the plate members 135 of the first light source unit 7 and the second light source unit 8.

The side plate portion 141 of the connection member 4 is mounted on a side surface of the bottom plate 3d of the first light source unit 7 and a side surface of the bottom plate 3d of the second light source unit 8 such that the side plate portion 141 is astride these side surfaces. A plurality of screw holes 141a are formed in the side plate portion 141. By threadedly inserting screws into the screw holes 141a and the plurality of screw holes 3dd formed in the side surfaces of the bottom plates 3d of the first light source unit 7 and the second light source unit 8, the side plate portion 141 is mounted on the bottom plates 3d of the first light source unit 7 and the second light source unit 8.

Flange portions 142 are provided on both end surfaces of the upper plate portion 140 of the connection member 4 in the direction in which the first light source unit 7 and the second light source unit 8 are arranged side by side. The flange portions 142 are perpendicular to the upper plate portion 140. Further, flange portions 142 are provided on both end surfaces of the side plate portion 141 of the connection member 4 in the direction in which the first light source unit 7 and the second light source unit 8 are arranged side by side. The flange portions 142 are perpendicular to the side plate portion 141.

The first drive substrate 5 is mounted on the side plate portion 131 of the plate member 135 of the first light source unit 7. A screw hole (not shown) is formed in the side plate portion 131 of the first light source unit 7. By threadedly inserting screws into this screw hole and the screw hole 5a formed in the first drive substrate 5, the first drive substrate 5 is mounted on the side plate portion 131 of the first light source unit 7.

Similarly, the second drive substrate 6 is mounted on the side plate portion 131 of the plate member 135 of the second light source unit 8. A screw hole (not shown) is formed in the side plate portion 131 of the second light source unit 8. By threadedly inserting screws into this screw hole and the screw hole 6a formed in the second drive substrate 6, the second drive substrate 6 is mounted on the side plate portion 131 of the second light source unit 8.

In the improved light source unit set 9 having the above-described structure, the connection member 4 and the plate members 135 of the first light source unit 7 and the second light source unit 8 form the substantially U-shaped wind tunnel 10 having the wind passage 34 which allows cooling wind to pass through the heat pipe units 3 of the first light source unit 7 and the second light source unit 8. The plurality of fins 3c of the heat pipe units 3 possessed by the first light source unit 7 and the second light source unit 8 are disposed in the wind passages 34 of the wind tunnel 10. If cooling wind passes through the wind passages 34, the cooling wind passes between the plurality of fins 3c of the heat pipe unit 3 in each of the first light source unit 7 and the second light source unit 8.

The upper plate portion of the wind tunnel 10 covering the upper portion of the fins 3c of the first light source unit 7 and the second light source unit 8 includes the upper plate portions 130 of the plate members 135 of the first light source unit 7 and the second light source unit 8, and the upper plate portion 140 of the connection member 4. More specifically, the upper plate portion of the wind tunnel 10 only includes a portion in which upper plate portions 130 of the first light source unit 7 and the second light source unit 8 and the upper plate portion 140 of the connection member 4 are superposed on each other, and a portion which is consisted of only the upper plate portion 140 of the connection member 4.

One of the side plate portions of the wind tunnel 10 covering one side portion of the fins 3c of the first light source unit 7 and the second light source unit 8 includes the side plate portions 131 of the plate members 135 of the first light source unit 7 and the second light source unit 8. The other side plate portion of the wind tunnel 10 covering the other side portion of the fins 3c of the first light source unit 7 and the second light source unit 8 includes the side plate portion 141 of the connection member 4.

As described above, according to the improved light source unit set 9, each of the first light source unit 7 and the second light source unit 8 includes one of two plate members 135 which constitute a portion of the wind tunnel 10 and which have the same structures. The connection member 4 connects the first light source unit 7 and the second light source unit 8 to each other, and constitutes a portion of the wind tunnel 10 except the portion thereof constituted by the two plate members 135.

Flange portions 10a are provided on peripheral edges of the openings of right and left ends of the wind tunnel 10. The flange portions 10a on the opening peripheral edge of the right end of the wind tunnel 10 include flange portion 132 provided on the right end surface of the side plate portion 131 of the plate member 135 of the first light source unit 7, the flange portion 142 provided on the right end surface of the upper plate portion 140 of the connection member 4 and the flange portion 142 provided on the right end surface of the side plate portion 141 of the connection member 4. The flange portion 10a on the opening peripheral edge of the left end of the wind tunnel 10 include flange portion 132 provided on the left end surface of the side plate portion 131 of the plate member 135 of the second light source unit 8, the flange portion 142 provided on the left end surface of the upper plate portion 140 of the connection member 4, and the flange portion 142 provided on the left end surface of the side plate portion 141 of the connection member 4.

Figure 17:
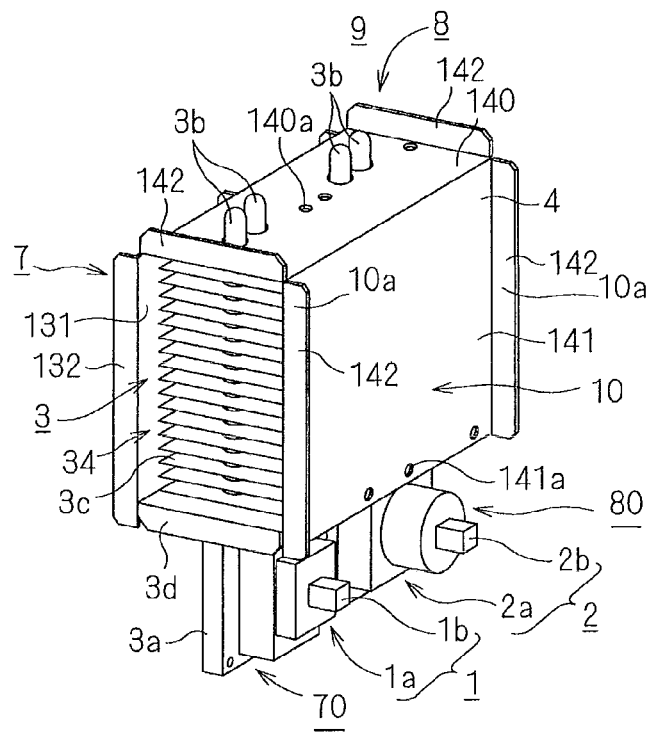
FIGS. 17 and 18 are diagrams showing a state where positions of the first light source unit and the second light source unit in the improved light source unit set are reversed.
Figure 18:
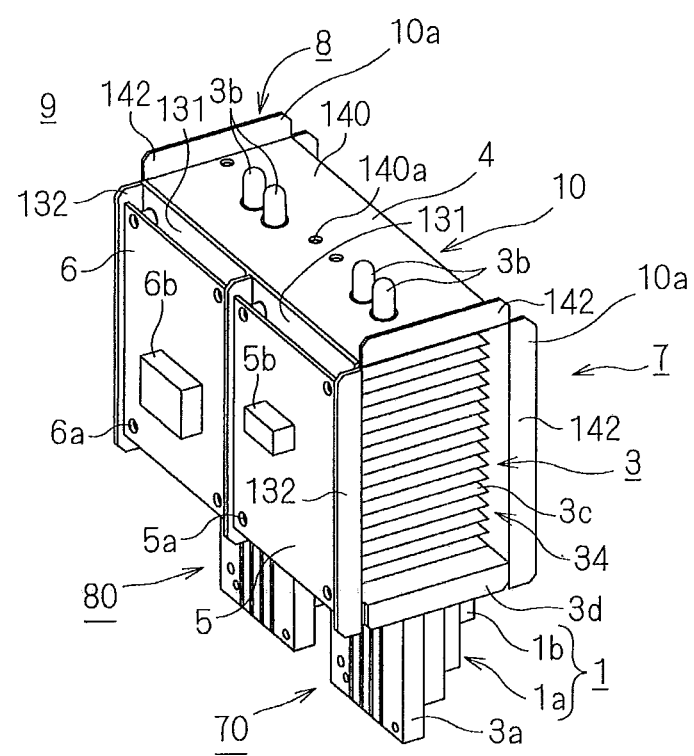

FIGS. 17 and 18 are diagrams showing a state where positions of the first light source unit 7 and the second light source unit 8 are reversed in the improved light source unit set 9 shown in FIGS. 15 and 16. According to the improved light source unit set 9 shown in FIGS. 17 and 18, the second light source unit 8 is located on the right side, and the first light source unit 7 is located on the left side as viewed from front. In the following description, the improved light source unit set 9 in which the first light source unit 7 and the second light source unit 8 are connected to each other such that the first light source unit 7 is located on the right side and the second light source unit 8 is located on the left side as viewed from front as shown in FIGS. 15 and 16 is called a "first improved light source unit set 9" in some cases. Further, the improved light source unit set 9 in which the first light source unit 7 and the second light source unit 8 are connected to each other such that the second light source unit 8 is located on the right side and the first light source unit 7 is located on the left side as viewed from front as shown in FIGS. 17 and 18 is called a "second improved light source unit set 9" in some cases.

As described above, according to the improved light source unit set 9, each of the first light source unit 7 and the second light source unit 8 includes the plate member 135 which constitutes a portion of the wind tunnel 10. The connection member 4 which connects the first light source unit 7 and the second light source unit 8 to each other, in other words, the connection member 4 which connects the first light source module 70 and the second light source module 80 to each other constitutes a portion of the wind tunnel 10 except a portion thereof constituted by the plate members 135 of the first light source unit 7 and the second light source unit 8. Hence, according to the improved light source unit set 9, it is possible to restrain the double structure in which both the connection member 4 and the plate members 135 are superposed on each other from being generated. According to this example, in the wind tunnel 10, the upper plate portion 140 of the connection member 4 is mounted on the upper plate portions 130 of the plate members 135. Therefore, the double structure in which the connection member 4 and the plate members 135 are superposed on each other is formed in a portion of the upper plate portion of the wind tunnel 10. However, in other portion of the wind tunnel 10, only one of the plate member 135 and the connection member 4 exists and the double structure is not constituted. Hence, it is possible to simplify the structure of the improved light source unit set 9 as compared with the above-described pre-improved light source unit set 9, and it is possible to enhance the material efficiency of using parts.

Although the portions of the first light source unit 7 and the second light source unit 8 which are screwed to the connection member 4 are the upper surfaces and one side surfaces of the first light source unit 7 and the second light source unit 8 in this example, if screwing distances and the like are appropriately set, it is possible to sufficiently strongly connect the first light source unit 7 and the second light source unit 8 to each other through the connection member 4.

According to the improved light source unit set 9, since the plate member 135 of the first light source unit 7 and the plate member 135 of the second light source unit 8 have the same structures, it is possible to reduce the number of kinds of the using parts. As a result, it is possible to reduce a material cost.

According to the improved light source unit set 9, the flange portions 142 are provided on the both end surfaces of the upper plate portion 140 of the connection member 4 in the direction in which the first light source unit 7 and the second light source unit 8 are arranged side by side. Hence, it is unnecessary to provide flange portions on the upper surfaces (upper plate portions 130) of the plate members 135 of the first light source unit 7 and the second light source unit 8. Hence, even if the positions of the first light source unit 7 and the second light source unit 8 are reversed in the improved light source unit set 9, flange portions are not formed on the central portions of the upper surfaces of the first light source unit 7 and the second light source unit 8 unlike the pre-improved light source unit set 9 shown in FIG. 11. Therefore, when the connection member 4 is mounted on the first light source unit 7 and the second light source unit 8, it is possible to avoid a case where the connection member 4 interferes with the flange portions and it becomes difficult to mount the connection member 4 on the first light source unit 7 and the second light source unit 8. Hence, according to the improved light source unit set 9, it is possible to reverse the positions of the first light source unit 7 and the second light source unit 8 and to use them while using the same parts as shown in FIGS. 17 and 18. As a result, even when the positions of the first light source unit 7 and the second light source unit 8 are reversed and the light source units are used, it is possible to restrain the number of parts from increasing.

According to the improved light source unit set 9, the first drive substrate 5 is mounted on the plate member 135 of the first light source unit 7. Therefore, it is possible to check the operation of the first light source unit 7 before it is connected to the second light source unit 8, that is, it is possible to check the operation of the first light source unit 7 in its alone state unlike the pre-improved light source unit set 9. Hence, even if a malfunction is found in the first light source unit 7, it is possible to reduce the reversing steps. Further, since it is possible to check the operations of the first light source module 70 and the first drive substrate 5 as a pair of members, it is possible to handle the first light source module 70 and the first drive substrate 5 as a pair of service parts, and this is extremely effective.

Similarly, the second drive substrate 6 is mounted on the plate member 135 of the second light source unit 8. Therefore, it is possible to check the operation of the second light source unit 8 before it is connected to the first light source unit 7, that is, it is possible to check the operation of the second light source unit 8 in its alone state unlike the pre-improved light source unit set 9. Hence, even if a malfunction is found in the second light source unit 8, it is possible to reduce the reversing steps. Further, since it is possible to check the operations of the second light source module 80 and the second drive substrate 6 as a pair of members, it is possible to handle the second light source module 80 and the second drive substrate 6 as a pair of service parts, and this is extremely effective.

The plate member 135 does not cover the entire circumference of the plurality of fins 3c of the heat pipe unit 3. Therefore, in the alone state of the first light source unit 7, the wind tunnel through which cooling wind passes is not formed. Therefore, when the operation of the first light source unit 7 alone is checked, a cooling effect of the first light source member 1 becomes small.

However, when the operation of the first light source unit 7 is checked, if the operation time of the first light source unit 7 is shortened, it is possible to restrain the temperature of the first light member 1 from rising. Therefore, even if the cooling effect of the first light source member 1 becomes small, no problem arises. When a sufficient cooling effect of the first light source member 1 is necessary, a wind tunnel for checking the operation may be formed in the first light source unit 7 as a jig. The same thing can be said also for the second light source unit 8.

Although a color of light which is output from the first light source member 1 and a color of light which is output from the second light source member 2 are different from each other in the above example, the colors may be the same. In this case, the first light source member 1 and the second light source member 2 may have the same structures, and the first drive substrate 5 and the second drive substrate 6 may have the same structures. Therefore, the first light source unit 7 and the second light source unit 8 may have the same structures.

<Internal Structure of Light Source Apparatus>

Figure 19:
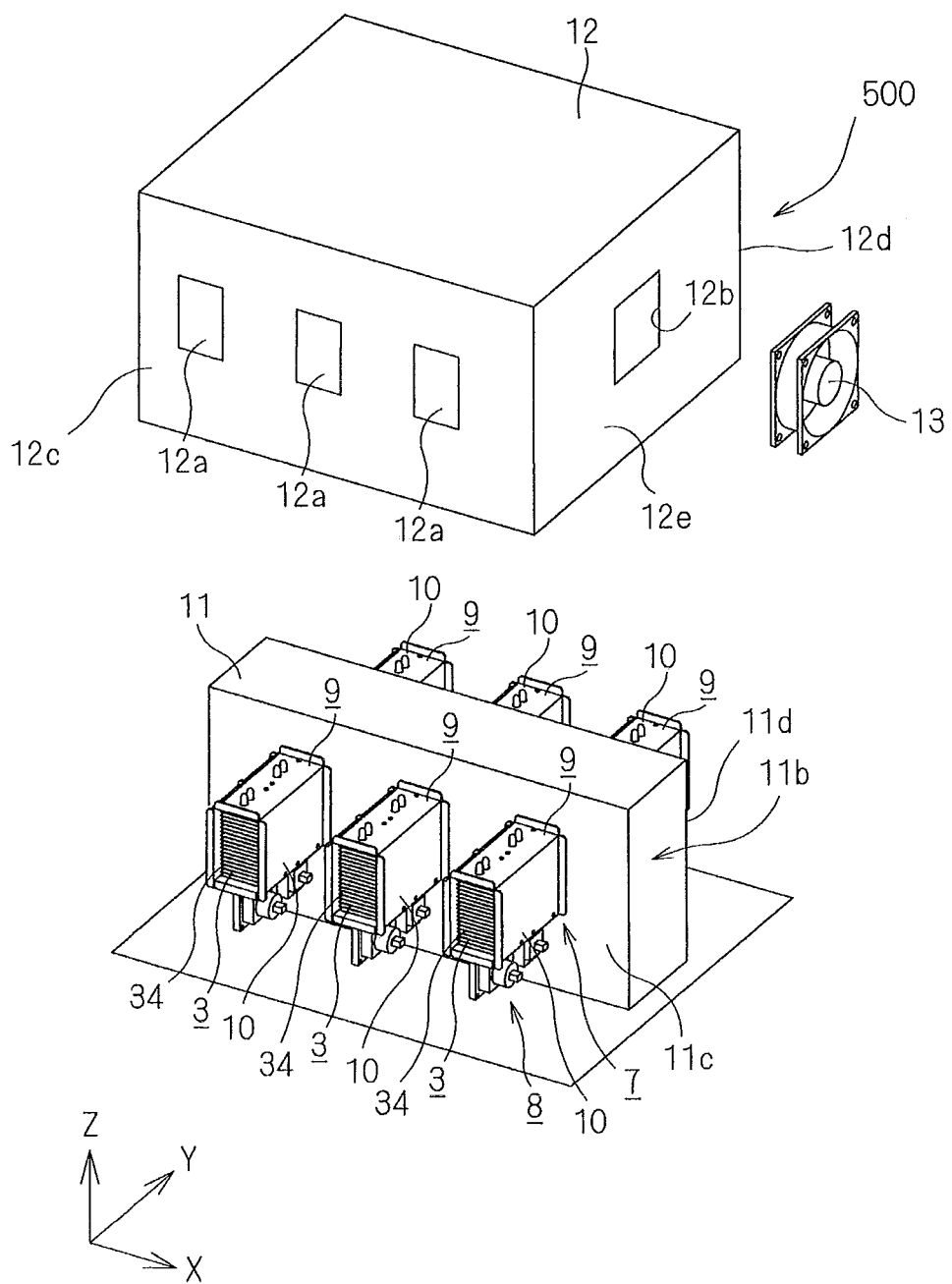
FIG. 19 is an exploded perspective view showing a structure of the light source apparatus.

Next, an internal structure of the light source apparatus 500 according to the preferred embodiment will be described. FIG. 19 is an exploded perspective view showing the structure of the light source apparatus 500. The internal structure of the light source apparatus 500 will be described using an XYZ rectangular coordinate system shown in FIG. 19.

Figure 22:
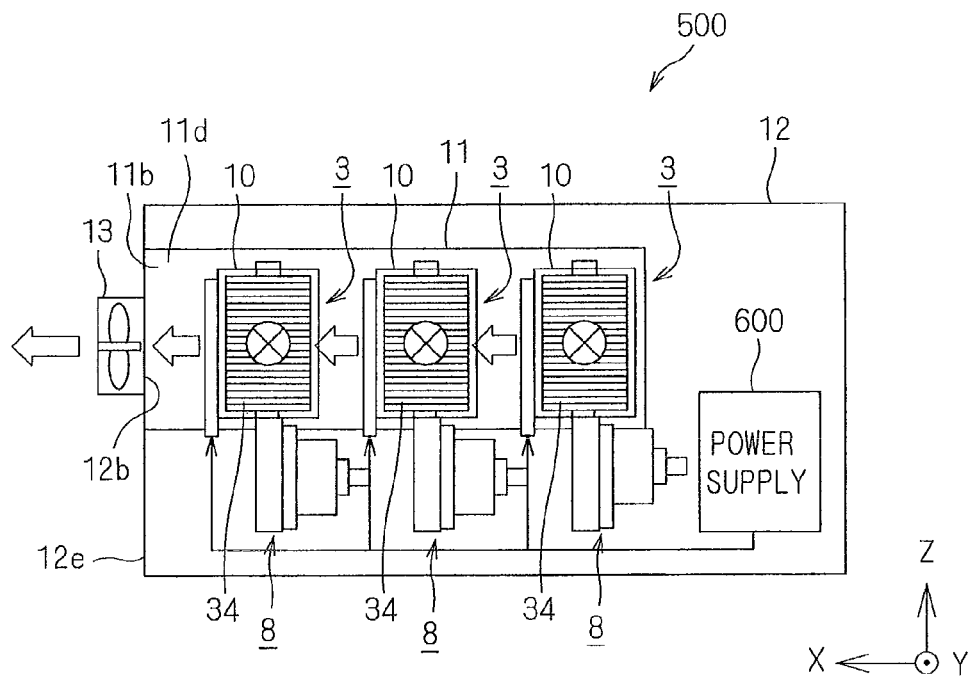

As shown in FIG. 19, the outer casing 12 of the light source apparatus 500 is provided with a plurality of improved light source unit sets 9 (six improved light source unit sets 9 in this example), the duct 11, and a power supply 600 (see FIG. 22). The plurality of improved light source unit sets 9 are mounted on the duct 11. The power supply 600 supplies power to the first drive substrates 5 and the second drive substrates 6 of the plurality of improved light source unit sets 9. In the light source apparatus 500, at least one pre-improved light source unit set 9 may be used instead of at least one of the plurality of improved light source unit sets 9.

Figure 21:
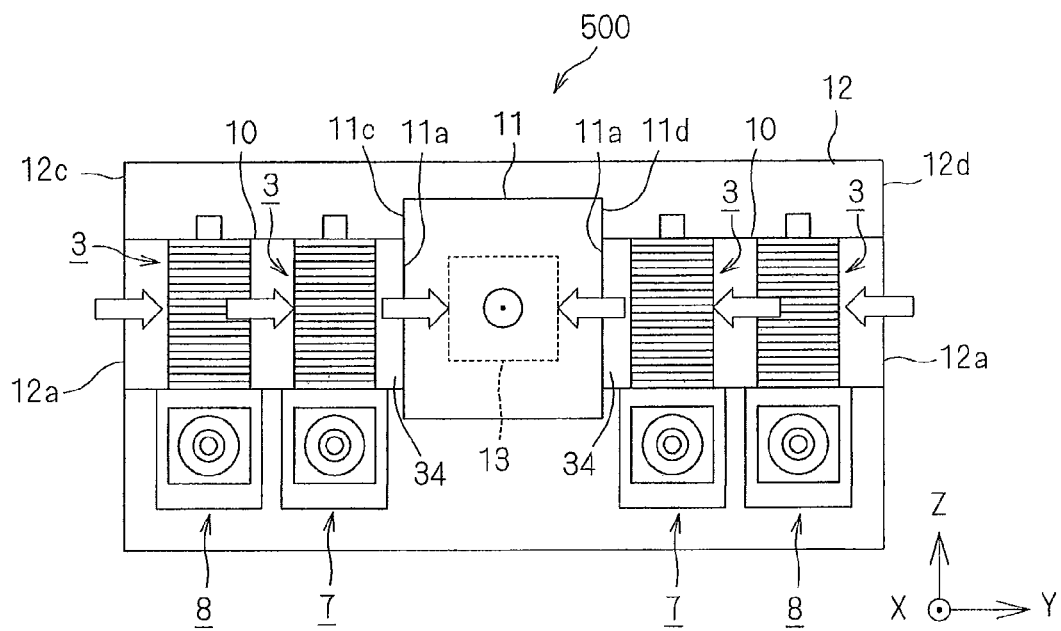
FIGS. 21 and 22 are sectional views showing the structure of the light source apparatus.

FIG. 20 is a perspective view showing the plurality of improved light source unit sets 9 in a state where they are mounted on the duct 11. In FIG. 20, a bottom plate of the outer casing 12 is shown so that positions of the improved light source unit sets 9 and the duct 11 in the outer casing 12 can easily be understood. FIG. 21 is a sectional view of the light source apparatus 500 in a Y-axis direction, and FIG. 22 is a sectional view of the light source apparatus 500 in an X-axis direction. In FIGS. 21 and 22, structures of the improved light source unit sets 9 and the cooling fan 13 are simplified and illustrated. In FIG. 21, arrows and a circle in which a dot is shown show a flowing direction of cooling wind. In FIG. 22, arrows and circles in which a cross is shown show a flowing direction of cooling wind. In FIG. 21, the circle in which the dot is shown shows that cooling wind flows from a deep side toward a near side in terms of a paper sheet of FIG. 21. In FIG. 22, circles in which the cross is shown show that cooling wind flows from a near side toward a deep side in terms of a paper sheet of FIG. 22.

Three intake-openings 12a are formed in each of the two side plate portions 12c and 12d of the outer casing 12 which are opposed to each other in the Y-axis direction. Cooling wind is taken into the outer casing 12 through the three intake-openings 12a. A discharge opening 12b is formed in one side plate portion 12e of the two side plate portions of the outer casing 12 which are opposed to each other in the X-axis direction. Cooling wind which is taken into the outer casing 12 is discharged outside of the outer casing 12 through the discharge opening 12b. The cooling fan 13 is mounted on a surface of the outer casing 12 to cover the discharge opening 12b.

The duct 11 is a pipe member having a square cross section, and it is formed from sheet metal. The duct 11 extends along the X-axis direction. A wind passage 11b through which cooling wind passes is formed in the duct 11. The duct 11 is supported by a support member (not shown) provided on an inner bottom surface of the outer casing 12.

In the duct 11, three connection openings 11a are formed in each of the two side plate portions 11c and 11d which are opposed to each other in the Y-axis direction. Each of the connection openings 11a is an opening through which the wind passage 11b of the duct 11 and the wind passage 34 possessed by the wind tunnel 10 of the improved light source unit set 9 are connected to each other.

The three first improved light source unit sets 9 in which the first light source units 7 are located on the right side are mounted on one side plate portion 11c of the duct 11 such that the right ends of the wind passages 34 of the wind tunnels 10 and the three connection openings 11a of the one side plate portion 11c are respectively connected to each other.

Figure 23:
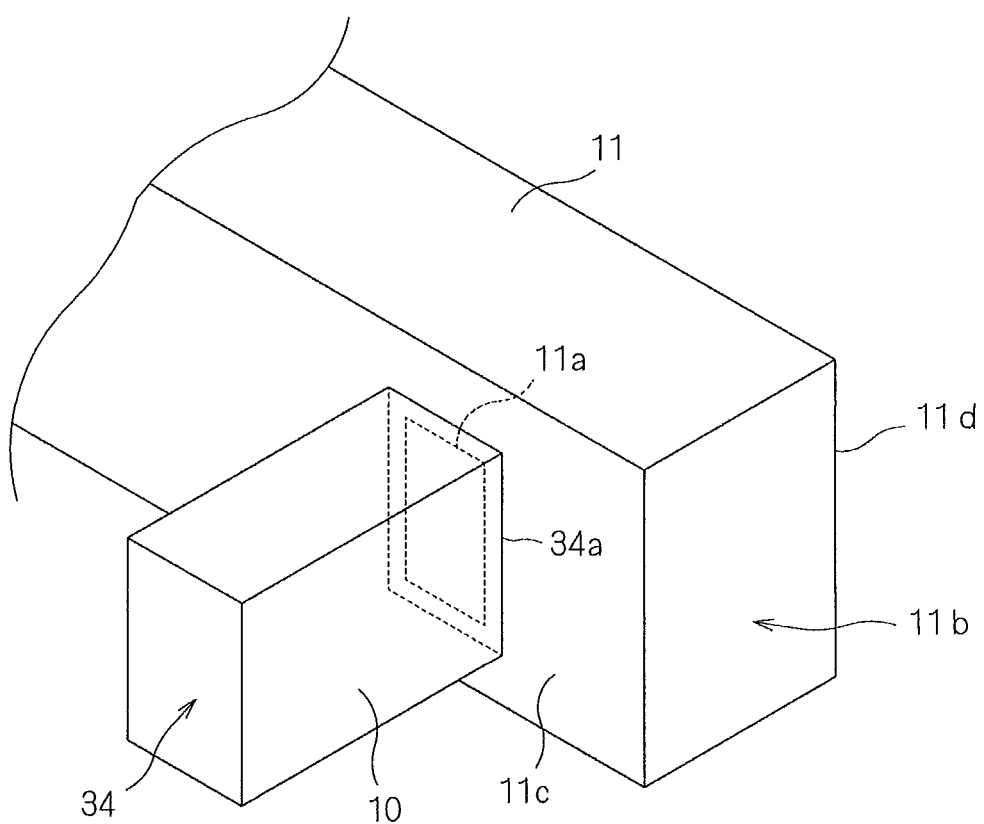
FIG. 23 is a diagram showing a state where a peripheral edge of one end of a wind passage of a wind tunnel surrounds a connection opening of the duct.

In a state where the first improved light source unit sets 9 are mounted on the side plate portion 11c of the duct 11, peripheral edge 34a (peripheral edge of opening of right end of wind tunnel 10) of the right end of the wind passage 34 of the first improved light source unit set 9 surround the connection opening 11a of the duct 11. FIG. 23 shows this state. FIG. 23 only shows the duct 11 and the wind tunnel 10, and illustration of the flange portion 10a of the wind tunnel 10 is omitted. As shown in FIG. 23, the right end peripheral edge 34a of the wind passage 34 constituted by the wind tunnel 10 surrounds the connection opening 11a formed in the side plate portion 11c of the duct 11. According to this configuration, an entire region of the connection opening 11a is surrounded by the wind tunnel 10. As a result, cooling wind passing through the wind passage 34 is less prone to leak from a boundary portion between the wind tunnel 10 and the duct 11. It is preferable that foam material is sandwiched between the side plate portion 11c of the duct 11 and the flange portion 10a provided on the right end peripheral edge of the wind passage 34 of the first improved light source unit set 9. According to this, a gap is restrained from generating between the wind tunnel 10 and the duct 11, and cooling wind is further less prone to leak.

Three second improved light source unit sets 9 in which the first light source units 7 are located on the left side are mounted on the other side plate portion 11d of the duct 11 such that the left ends of the wind passages 34 of the wind tunnels 10 and three connection openings 11a of the other side plate portion 11d are respectively connected to each other. In a state where the second improved light source unit sets 9 are mounted on the side plate portion 11d of the duct 11, the left end peripheral edge of the wind passage 34 of the second improved light source unit set 9 surrounds the connection opening 11a of the duct 11. According to this configuration, the entire region of the connection opening 11a is surrounded by the wind tunnel 10, and cooling wind passing through the wind passage 34 is less prone to leak from the boundary portion between the wind tunnel 10 and the duct 11. It is preferable that foam material is sandwiched between the side plate portion 11d of the duct 11 and the flange portion 10a provided on the left end peripheral edge of the wind passage 34 of the second improved light source unit set 9. According to this, a gap is restrained from generating between the wind tunnel 10 and the duct 11, and cooling wind is further less prone to leak.

In a state where the duct 11 is accommodated in the outer casing 12, one end of the wind passage 11b of the duct 11 is connected to the discharge opening 12b of the outer casing 12. The one end peripheral edge of the wind passage 11b of the duct 11 surrounds the discharge opening 12b of the outer casing 12. According to this, the entire region of the discharge opening 12b is surrounded by the duct 11. Hence, cooling wind passing through the wind passage 11b of the duct 11 is less prone to leak from the boundary portion between the duct 11 and the outer casing 12.

The duct 11 functions as a collective wind tunnel which collects cooling wind passing through the wind passages 34 of the plurality of improved light source unit sets 9 and introduces the cooling wind to outside of the outer casing 12. The cooling wind which passes through the wind passages 34 of the six improved light source unit sets 9 mounted on the duct 11 is collected into the wind passage 11b of the duct 11, passes through the wind passage 11b, and is discharged outside of the outer casing 12 from the discharge opening 12b.

The three intake-openings 12a provided in the side plate portion 12c of the outer casing 12 are respectively connected to the left ends of the wind passages 34 of the three first improved light source unit sets 9 accommodated in the outer casing 12. The left end peripheral edge of the wind passage 34 of the first improved light source unit set 9 surround the intake-opening 12a of the outer casing 12 like the relation between the right end peripheral edge 34a of the wind passage 34 and the connection opening 11a of the duct 11. According to this, the entire region of the intake-opening 12a is surrounded by the wind tunnel 10. As a result, cooling wind taken from the intake-opening 12a is less prone to leak from the boundary between the intake-opening 12a and the wind tunnel 10. It is preferable that a foam material is sandwiched between the side plate portion 12c of the outer casing 12 and the flange portion 10a provided on the left end peripheral edge of the wind passage 34 of the first improved light source unit set 9. According to this, a gap is restrained from generating between the outer casing 12 and the wind tunnel 10, and cooling wind is further less prone to leak.

The three intake-openings 12a provided in the side plate portion 12d of the outer casing 12 are respectively connected to the right ends of the wind passages 34 of the three second improved light source unit sets 9 accommodated in the outer casing 12. The right end peripheral edge of the wind passage 34 of the second improved light source unit set 9 surrounds the intake-opening 12a of the outer casing 12. According to this, cooling wind taken from the intake-opening 12a is less prone to leak from the boundary between the intake-opening 12a and the wind tunnel 10. It is preferable that a foam material is sandwiched between the side plate portion 12d of the outer casing 12 and the flange portion 10a provided on the right end peripheral edge of the wind passage 34 of the second improved light source unit set 9. According to this, a gap is restrained from generating between the outer casing 12 and the wind tunnel 10, and cooling wind is further less prone to leak.

The cooling fan 13 which is mounted on the outer casing 12 to cover the discharge opening 12b of the outer casing 12 rotates such that air in the outer casing 12 is discharged outside of the outer casing 12 from the discharge opening 12b.

A plurality of optical fibers are connected to the first light source tip ends 1b of the first light source members 1 of the plurality of first light source units 7 (six first light source units 7) accommodated in the outer casing 12. The optical fibers are bundled and pulled outside of the outer casing 12 from the upper surface of the outer casing 12 for example. According to this, red laser light which is output from the plurality of first light source members 1 is taken outside of the outer casing 12. A plurality of optical fibers are connected to the second light source tip ends 2b of the second light source members 2 in the plurality of second light source units 8 (six second light source units 8) accommodated in the outer casing 12. The optical fibers are bundled and pulled outside of the outer casing 12 from the upper surface of the outer casing 12 for example. According to this, green laser light which is output from the plurality of second light source members 2 is taken outside of the outer casing 12. The red laser light and the green laser light which are output from the light source apparatus 500 are used as light sources by a display such as a projector.

In the light source apparatus 500, if the cooling fan 13 rotates, cooling wind is taken into the outer casing 12 from the plurality of intake-openings 12a of the outer casing 12. Then, by the driving force of the cooling fan 13, the cooling wind which is taken into the outer casing 12 passes between the plurality of fins 3c of the heat pipe unit 3 in the plurality of improved light source unit sets 9 (three first improved light source unit sets 9 and three second improved light source unit sets 9) in the outer casing 12, and the cooling wind is collected into the wind passage 11b of the duct 11. The cooling wind which is collected into the wind passage 11b of the duct 11 and which passes through the plurality of improved light source unit sets 9, by the driving force, passes through the wind passage 11b and is discharged outside of the outer casing 12 from the discharge opening 12b of the outer casing 12. The plurality of light source members (12 light source members in this example) provided in the light source apparatus 500 are cooled in this manner.

In this preferred embodiment, there is a difference in a cooling degree between the first light source unit 7 and the second light source unit 8 which emit mutually different colors in terms of likelihood. In other words, there is a difference between the first light source unit 7 and the second light source unit 8 in terms of how much they should be cooled. Therefore, when a plurality of improved light source unit sets 9 are disposed in the outer casing 12, it is necessary to dispose the same kinds of light source units on the windward side (on the side of intake-opening 12a of outer casing 12) where fresh air flows. Hence, in the improved light source unit set 9 on the side of the side plate portion 11c of the duct 11 and in the improved light source unit set 9 on the side of the side plate portion 11d of the duct 11, it is necessary to reverse the positions of the first light source unit 7 and the second light source unit 8.

Hence, in the light source apparatus 500 of the preferred embodiment, as shown in FIGS. 19 and 20, the first improved light source unit sets 9 are mounted on the side plate portion 11c of the duct 11, and the second improved light source unit sets 9 are mounted on the side plate portion 11d of the duct 11. According to this configuration, in the plurality of improved light source unit sets 9 in the outer casing 12, the second light source units 8 are always located on the windward side, i.e., on the side of the intake-openings 12a of the outer casing 12.

<Concerning Merits of Light Source Apparatus of Preferred Embodiment>

Figure 24:
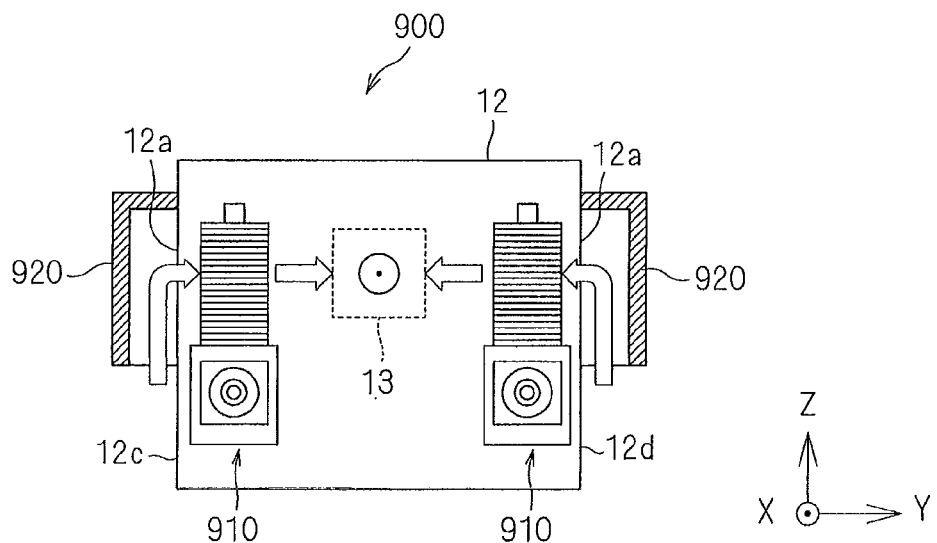
FIGS. 24 and 25 are sectional views showing a structure of a comparison-object light source apparatus.
Figure 25:
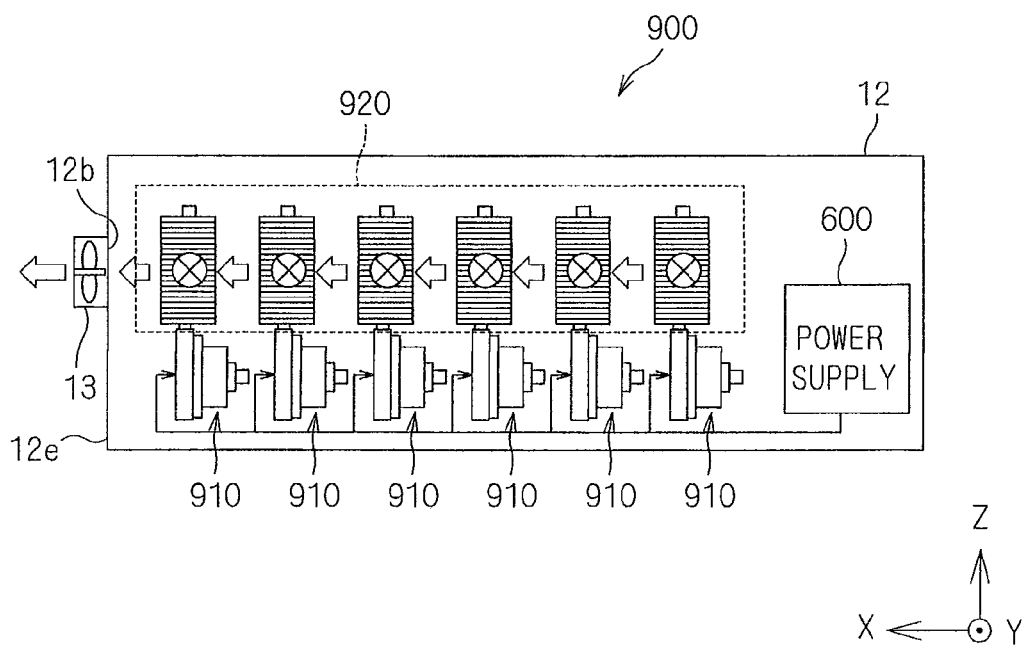

Next, merits of the light source apparatus 500 of the preferred embodiment will be described while comparing with light source apparatuses of other configurations. FIGS. 24 and 25 are diagrams showing a cross section structure of a comparison-object light source apparatus 900 which is compared with the light source apparatus 500. FIG. 24 corresponds to FIG. 21, and FIG. 25 corresponds to FIG. 22. In FIGS. 24 and 25, arrows, a circle in which a dot is shown, and circles in which a cross is shown show a flowing direction of cooling wind like in FIGS. 21 and 22.

According to the comparison-object light source apparatus 900, 12 light source modules 910 are disposed in an outer casing 12. Each of the light source modules 910 has the same structure as that of the first light source module 70 of the preferred embodiment, and a drive substrate similar to the first drive substrate 5 is mounted on each of the light source modules 910. Each of the light source modules 910 may have the same structure as that of the second light source module 80 of the preferred embodiment. Alternatively, one or some of the 12 light source modules 910 may have the same structures as those of the first light source modules 70, and remaining light source modules 910 may have the same structures as those of the second light source modules 80.

Six of the 12 light source modules 910 are disposed along a side plate portion 12c of the outer casing 12 in a row, and remaining six light source modules 910 are arranged along a side plate portion 12d of the outer casing 12 in a row. In the outer casing 12, six intake-openings 12a are provided in each of the side plate portion 12c and the side plate portion 12d. The light source modules 910 are disposed such that the heat pipe units thereof are opposed to the intake-openings 12a formed in the surface of the outer casing 12.

In the comparison-object light source apparatus 900, light shield covers 920 covering the six intake-openings 12a formed in the side plate portion 12c of the outer casing 12 are mounted on an outer main surface of the side plate portion 12c. Similarly, light shield covers 920 covering the six intake-openings 12a formed in the side plate portion 12d of the outer casing 12 are mounted on the outer main surface of the side plate portion 12d. A bottom surface of each of the light shield covers 920 opens so that cooling wind is taken into the outer casing 12 from the intake-opening 12a. The power supply 600 for supplying power to the drive substrate mounted on each of the light source modules 910 is provided in the outer casing 12. A cooling fan 13 is mounted on a side plate portion 12e of the outer casing 12 such that the cooling fan 13 covers the discharge opening 12b provided thereon.

A plurality of optical fibers are respectively connected to the light source tip ends of the light source members of the plurality of light source modules 910 accommodated in the outer casing 12. The plurality of optical fibers are bundled and pulled outside of the outer casing 12 from an upper surface of the outer casing 12 for example. According to this configuration, red laser light which is output from the plurality of light source modules 910 is taken outside of the outer casing 12. Red laser light which is output from the comparison-object light source apparatus 900 is used as a light source for a display such as a projector.

The comparison-object light source apparatus 900 is not provided with wind tunnels surrounding the heat pipe units of the light source modules 910 nor a duct for collecting the cooling wind which passes through the heat pipe units of the plurality of light source modules 910.

According to the comparison-object light source apparatus 900 having the above-described structure, if the cooling fan 13 rotates, cooling wind passes through the opening formed in the bottom surface of the light shield cover 920 mounted on the surface of the outer casing 12 and then the cooling wind is taken into the outer casing 12 from the plurality of intake-openings 12*a*. The cooling wind which is taken into the outer casing 12, by the driving force of the cooling fan 13, passes between the plurality of fins of the heat pipe units of the plurality of light source modules 910 in the outer casing 12, and the cooling wind is discharged outside of the outer casing 12 from the discharge opening 12*b* of the outer casing 12. The light source members of the plurality of light source modules 910 provided in the comparison-object light source apparatus 900 are cooled in this manner.

In the comparison-object light source apparatus 900, if the optical fibers connected to the light source members of the light source modules 910 are erroneously disconnected due to vibration or the like, or if the optical fibers are not connected to the light source members of the light source modules 910 due to assembling error, light is generated in the outer casing 12. If this light leaks outside of the comparison-object light source apparatus 900 through the intake-openings 12*a* formed in the surface of the outer casing 12, there is a possibility that the light adversely affects peripheries in some cases. According to the comparison-object light source apparatus 900, even if light which is output from the light source module 910 leaks outside of the outer casing 12 from the intake-opening 12*a*, since the light which leaks outside of the outer casing 12 can be shielded by the light shield cover 920 which cover the intake-opening 12*a*, it is possible to restrain the light from leaking outside of the comparison-object light source apparatus 900.

According to the comparison-object light source apparatus 900, however, since the light shield cover 920 is mounted on the surface of the outer casing 12, outer dimensions of the comparison-object light source apparatus 900 inevitably become large.

Further, according to the comparison-object light source apparatus 900, cooling wind passes through the opening formed in the bottom surface of the light shield cover 920 and then, passes through the intake-opening 12*a* formed in the side surface of the outer casing 12 and is taken into the outer casing 12 as shown by arrows in FIG. 24. Therefore, when cooling wind is taken into the outer casing 12, a direction of the cooling wind is bent. Hence, a pressure loss is generated, a velocity of the cooling wind flowing between the plurality of fins of the light source module 910 is reduced, and there is a possibility that the cooling effect of the light source member of the light source module 910 is deteriorated.

Therefore, according to the comparison-object light source apparatus 900, although it is possible to restrain light from leaking outside of the comparison-object light source apparatus 900 by the light shield cover 920 provided on the side surface of the outer casing 12, the outer dimensions become large, and it becomes difficult to realize the sufficient cooling effect of the light source member.

On the other hand, according to the light source apparatus 500 of the preferred embodiment, the wind tunnel 10 which surrounds the heat pipe units 3 of the first light source module 70 and the second light source module 80 have the wind passage 34 which allows cooling wind to pass through the heat pipe units 3, and one end of the wind passage 34 is connected to the intake-opening 12*a* of the outer casing 12. Therefore, at least a portion of the intake-opening 12*a* is surrounded by the wind tunnel 10. In the preferred embodiment, the entire region of the intake-opening 12*a* is surrounded by the wind tunnel 10. Therefore, even if the optical fibers are disconnected from the first light source member 1 or the second light source member 2 or the optical fibers are not connected to the first light source member 1 or the second light source member 2, light moving from the first light source member 1 or the second light source member 2 toward the intake-opening 12*a* is less prone to leak outside of the outer casing 12 from the intake-opening 12*a*. Hence, it is possible to restrain light from leaking outside of the light source apparatus 500 without mounting the above-described light shield cover 920 on the side surface of the outer casing 12. In the preferred embodiment, since the light shield cover 920 is not mounted on the surface of the outer casing 12, it is possible to reduce the outer dimensions of the light source apparatus 500, to secure a sufficient cooling effect of the light source member, and to restrain light from leaking outside of the light source apparatus 500.

In the preferred embodiment, since the wind tunnel 10 surrounds the plurality of fins 3*c* of the heat pipe unit 3, it is possible not only to restrain light which moves from the first light source member 1 or the second light source member 2 toward the intake-opening 11*a* from leaking outside of the outer casing 12, but also to restrain light which is output from the first light source member 1 or the second light source member 2 from passing between the plurality of fins 3*c* of the heat pipe unit 3 and leaking outside of the outer casing 12 from the intake-opening 12*a*. Hence, it is possible to further restrain light from leaking outside of the light source apparatus 500.

If one end peripheral edge of the wind passage 34 of the wind tunnel 10 surrounds the intake-opening 12*a* as in the preferred embodiment, the entire region of the intake-opening 12*a* is surrounded by the wind tunnel 10. Hence, it is possible to further restrain light from leaking outside of the outer casing 12.

Even if the one end opening of the wind tunnel 10 is smaller than the intake-opening 12*a* and the one end peripheral edge of the wind passage 34 surrounds only a portion of the intake-opening 12*a*, since the portion of the intake-opening 12*a* is surrounded by the wind tunnel 10, it is possible to restrain light from leaking outside of the light source apparatus 500 to some extent.

The light source apparatus 500 of the preferred embodiment is provided with the duct 11 having the wind passage 11*b* through which cooling wind passes. The other end of the wind passage 34 of the wind tunnel 10 of the light source unit set 9 is connected to the connection opening 11*a* of the duct 11, and the one end of the wind passage 11*b* of the duct 11 is connected to the discharge opening 12*b* of the outer casing 12. According to this configuration, the intake-opening 12*a* and the discharge opening 12*b* are connected to each other through the wind tunnel 10 and the duct 11. Therefore, it is possible to avoid a case where light which is output from the first light source member 1 or the second light source member 2 enters the wind tunnel 10 from the other end opening of the wind tunnel 10, and the light leaks outside of the outer casing 12 from the intake-opening 12a.

If the other end peripheral edge 34a of the wind passage 34 of the wind tunnel 10 surrounds the connection opening 11a of the duct 11 as in the embodiment, the entire region of the connection opening 11a is surrounded by the wind tunnel 10. Hence, light which is output from the first light source member 1 or the second light source member 2 is less prone to enter the wind tunnel 10 from the other end opening of the wind tunnel 10, and it is possible to further restrain light from leaking outside of the outer casing 12 from the intake-opening 12a.

Even if the other end opening of the wind tunnel 10 is smaller than the connection opening 11a and the other end peripheral edge 34a of the wind passage 34 surrounds only a portion of the connection opening 11a, since the portion of the connection opening 11a is surrounded by the wind tunnel 10, it is possible to restrain light from leaking outside of the light source apparatus 500 to some extent.

According to the light source apparatus 500 of the preferred embodiment, since the one end peripheral edge of the wind passage 34 of the wind tunnel 10 on the side of the outer casing 12 includes the flange portions (flange portions 10a, 310a), it is possible to restrain a gap from generating between the wind tunnel 10 and the outer casing 12. As a result, cooling wind is less prone to leak outside of the wind passage 34, and light is less prone to leak outside of the outer casing 12 from the intake-opening 12a.

According to the light source apparatus 500 of the preferred embodiment, since the one end peripheral edge of the wind passage 34 of the wind tunnel 10 on the side of the duct 11 includes the flange portions (flange portions 10a, 310a), it is possible to restrain a gap from generating between the wind tunnel 10 and the duct 11. As a result, cooling wind is less prone to leak outside of the wind passage 34, it is possible to further restrain light which is output from the first light source member 1 or the second light source member 2 from entering into the wind tunnel 10 from the one end opening of the wind tunnel 10 on the side of the duct 11, and from leaking outside of the outer casing 12 from the intake-opening 12a.

According to the light source unit set 9 of the preferred embodiment, cooling wind which is taken from the intake-opening 12a of the outer casing 12 passes through the wind passage 34 of the wind tunnel 10, and passes through the cooling bodies (heat pipe units 3 of first light source module 70 and the second light source module 80) of the plurality of light source modules. Therefore, the amount of cooling wind required for cooling the light source members of the plurality of light source modules can be reduced. In other words, the cooling bodies of the plurality of light source modules possessed by the light source unit set 9 are disposed in series with respect to the moving direction (direction toward duct 11 from intake-opening 12a of outer casing 12) of cooling wind in the wind passage 34. Therefore, the amount of cooling wind required for cooling the light source members of the plurality of light source modules can be reduced. In the preferred embodiment, the light source unit set 9 includes the two light source modules, and the cooling bodies of the two light source modules are disposed in series with respect to the moving direction of cooling wind in the wind passage 34. Therefore, the amount of cooling wind required for cooling the light source members of the two light source modules can be reduced to about half as compared with a case where the cooling bodies of the two light source modules are arranged in parallel with respect to the moving direction of cooling wind in the wind passage 34.

As described above, according to the preferred embodiment, since it is possible to reduce the amount of cooling wind required for cooling the light source members of the plurality of light source modules possessed by the light source unit set 9, it is possible to employ a cooling fan 13 having a small amount of wind. When hot wind discharged out from the cooling fan 13 is discharged outside of a building where the light source apparatus 500 is disposed, a capacity of discharging equipment installed in the building can be reduced.

When the cooling bodies of the plurality of light source modules are disposed in series with respect to the moving direction of cooling wind in the wind passage 34, a static pressure required by the cooling fan 13 is increased as compared with a case where the cooling bodies are disposed in parallel. Generally, the smaller the wind amount of a cooling fan becomes, the greater the static pressure becomes. Hence, even if the static pressure required by the cooling fan 13 is increased, no problem arises.

When cooling bodies of a plurality of light source modules are disposed in series with respect to the moving direction of cooling wind in the wind passage 34, a temperature of the cooling wind which passes through the cooling body of the light source module (first light source module 70) on the lee side (on the side of duct 11) slightly rises. If the slight temperature rise causes a problem, the light source module should be cooled by attaching a Peltier element on the light source module on the lee side.

The preferred embodiment of the present invention can appropriately be modified or omitted within a range of the present invention. For example, although the first light source unit 7 and the second light source unit 8 are respectively provided with the first drive substrate 5 and the second drive substrate 6 in the preferred embodiment, the first light source unit 7 may not be provided with the first drive substrate 5 and the second light source unit 8 may not be provided with the second drive substrate 6.

In the first light source unit 7, the first drive substrate 5 may be mounted on the plate member 135 such that a thermal conduction member is interposed therebetween. More specifically, a heat conduction sheet is pasted on an electric part which is mounted on the first drive substrate 5 and whose temperature rises during its operation, and the first drive substrate 5 is mounted on the plate member 135 such that the heat conduction sheet is pressed against the plate member 135. The plate member 135 is mounted on the heat pipe unit 3. Therefore, if the first drive substrate 5 is mounted on the plate member 135 such that the thermal conduction member is interposed therebetween, the first drive substrate 5 and the heat pipe unit 3 are thermally connected to each other. Hence, the first drive substrate 5 can be cooled using the heat pipe unit 3.

Similarly, in the second light source unit 8, the second drive substrate 6 may be mounted on the plate member 135 such that a thermal conduction member is interposed therebetween. More specifically, a heat conduction sheet is pasted on an electric part which is mounted on the second drive substrate 6 and whose temperature rises during its operation, and the second drive substrate 6 is mounted on the plate member 135 such that the heat conduction sheet is pressed against the plate member 135. According to this configuration, the second drive substrate 6 and the heat pipe unit 3 are thermally connected to each other, and the second drive substrate 6 can be cooled using the heat pipe unit 3.

Figure 26:
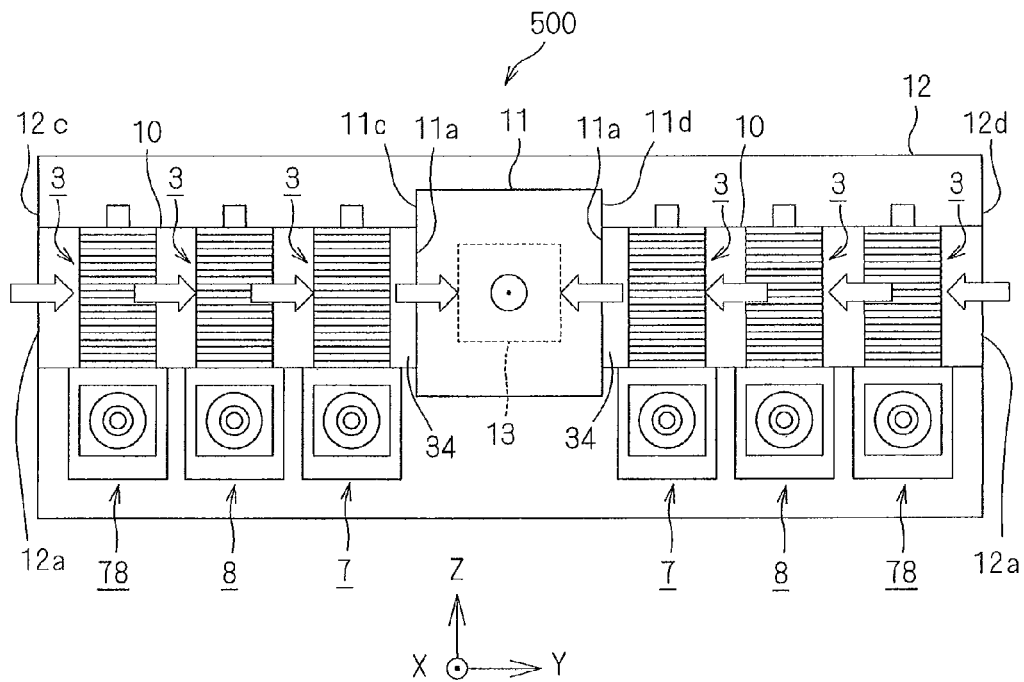
FIGS. 26 and 27 are sectional views showing a structure of the light source apparatus to which three light source units are connected in each of the light source unit sets.
Figure 27:
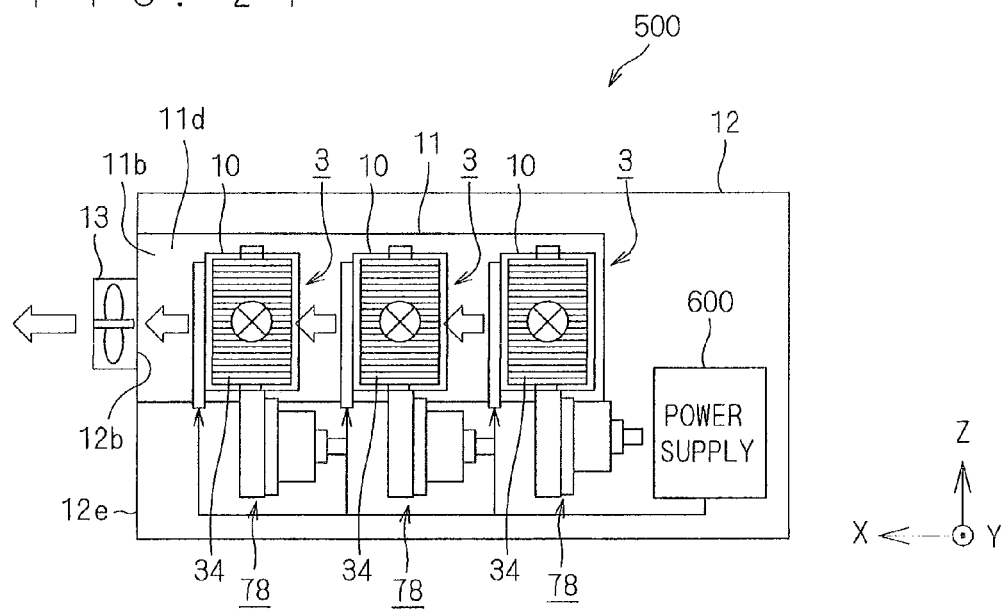

Although the two light source units (two light source modules) are connected to each other in the light source unit set 9, three or more light source units (three light source modules) may be connected to one another. FIGS. 26 and 27 show a state where three light source units are connected to one another in the light source unit set 9. FIGS. 26 and 27 respectively correspond to FIGS. 21 and 22.

In the light source apparatus 500 shown in FIGS. 26 and 27, the light source unit sets 9 are further provided with third light source units 78, respectively. Each of the third light source units 78 has the same structure as those of the first light source unit 7 and the second light source unit 8, and outputs blue laser light for example. In each of the light source unit sets 9, the wind tunnel 10 surrounds the plurality of fins 3c of the heat pipe unit 3 of the first light source unit 7, the second light source unit 8 and the third light source unit 78. The plurality of fins 3c of the first light source unit 7, the second light source unit 8 and the third light source unit 78 are disposed in the wind passage 34 of the wind tunnel 10. In each of the light source unit sets 9, the third light source unit 78 is disposed on the windward side. Cooling wind which is taken in from the intake-opening 12a of the outer casing 12 passes through the wind passage 34 of the wind tunnel 10, sequentially passes through the heat pipe unit 3 of the third light source unit 78, the heat pipe unit 3 of the second light source unit 8 and the heat pipe unit 3 of the first light source unit 7, and enters the wind passage 11b of the duct 11. A plurality of optical fibers are respectively connected to light source members of the plurality of third light source units 78 provided in the outer casing 12, and the plurality of optical fibers are bundled and pulled outside from the upper surface of the outer casing 12 for example.

Figure 28:
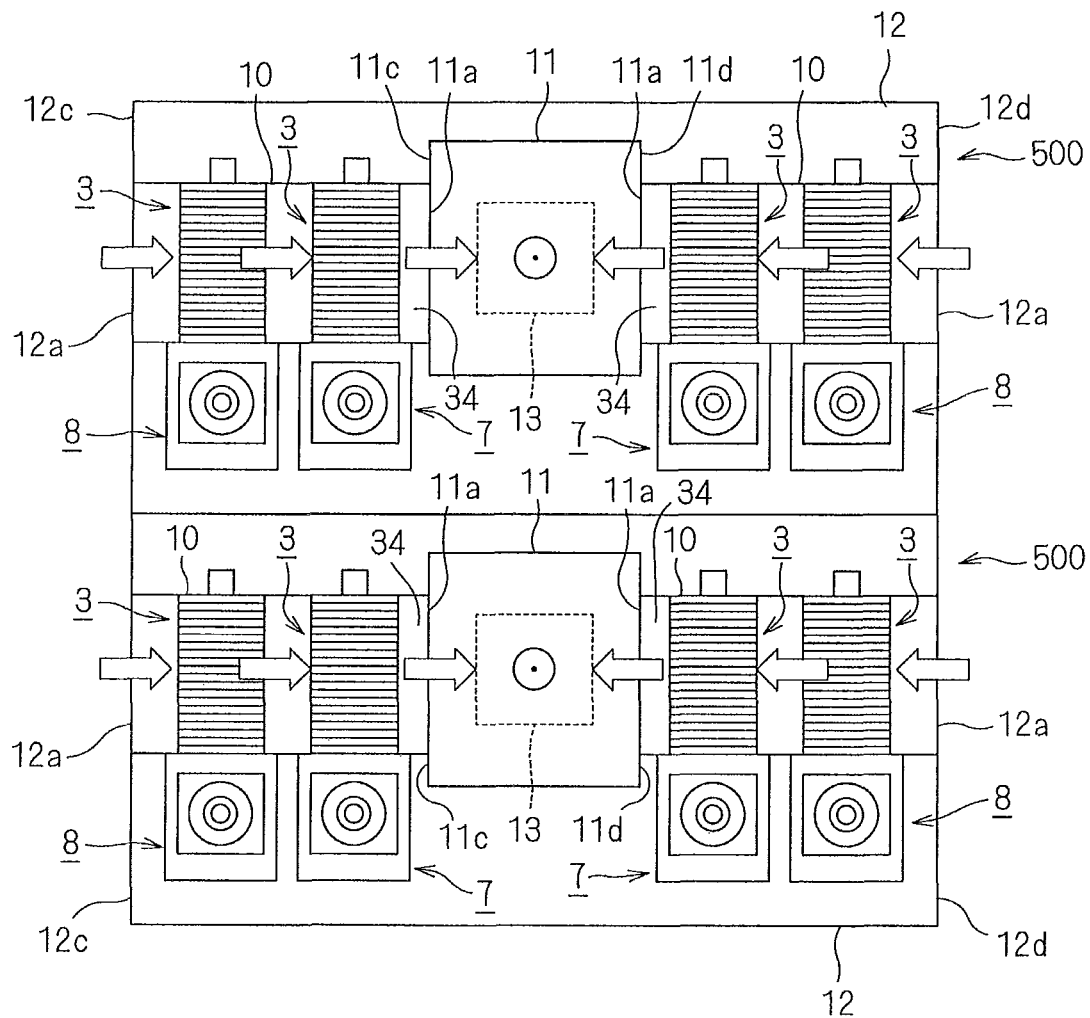
FIGS. 28 and 29 are diagrams showing a state where two light source apparatuses are stacked on each other and used.
Figure 29:
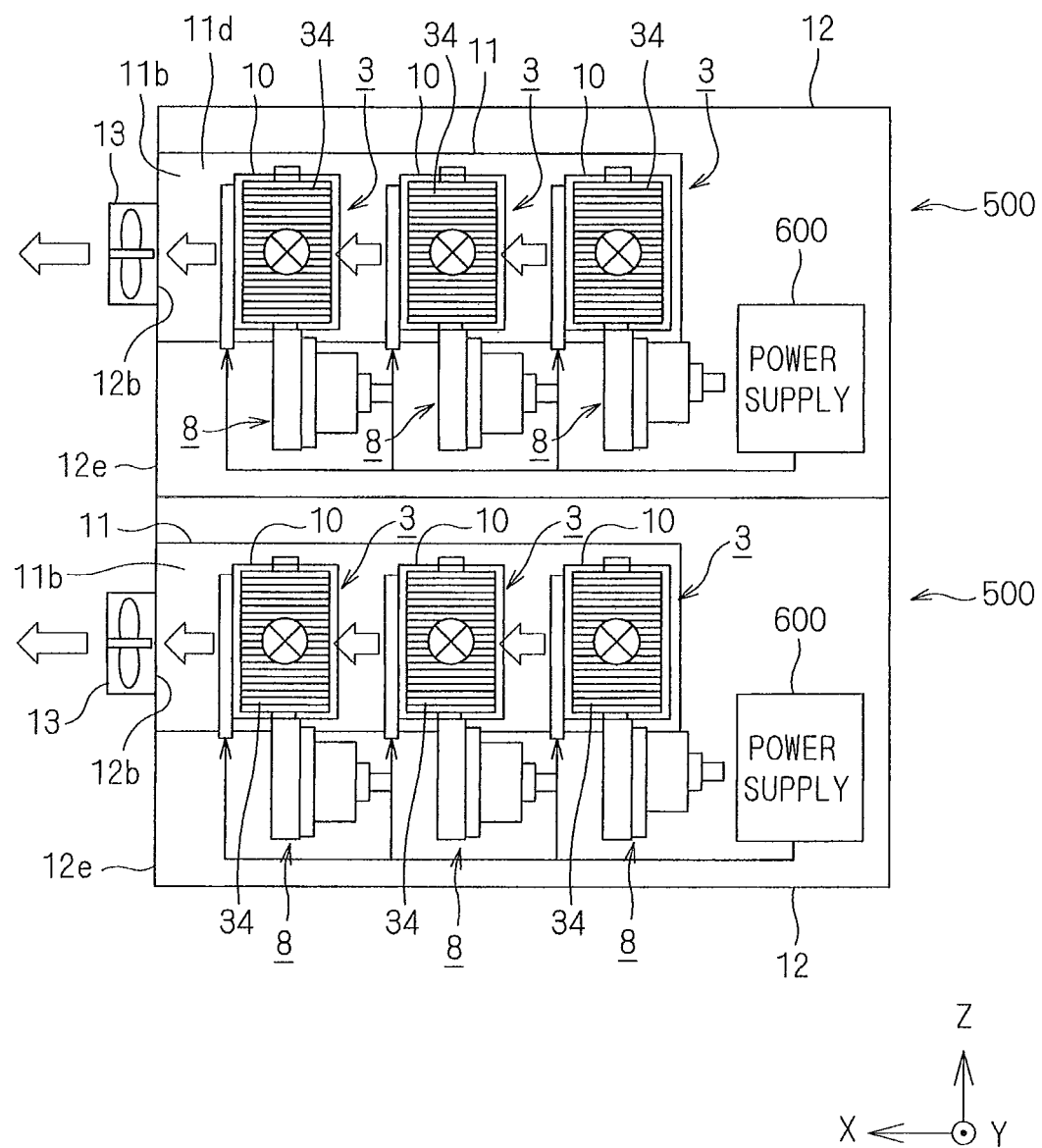

As shown in FIGS. 28 and 29, a plurality of light source apparatuses 500 may be stacked on each other and may be used. FIGS. 28 and 29 respectively correspond to FIGS. 21 and 22. In examples of FIGS. 28 and 29, two light source apparatuses 500 are stacked on each other. When the two light source apparatuses 500 are stacked on each other in this manner, the plurality of optical fibers which are pulled out from the upper surface of the outer casing 12 of the lower light source apparatus 500 and which are respectively connected to the plurality of first light source units 7 are introduced into the outer casing 12 from a bottom surface of the outer casing 12 of the upper light source apparatus 500. In the upper light source apparatus 500, the plurality of optical fibers respectively connected to the plurality of first light source units 7 of the light source apparatus, and the plurality of optical fibers which are introduced into the outer casing 12 from the bottom surface of the outer casing 12 of the light source apparatus and which are respectively connected to the plurality of first light source units 7 in the lower light source apparatus 500 are bundled, and these optical fibers are led outside the outer casing 12 from the upper surface of the outer casing 12 of the light source apparatus. The optical fibers connected to the second light source unit 8 are also configured in the same manner.

The light shield cover 920 possessed by the comparison-object light source apparatus 900 may be mounted on the surface of the outer casing 12 to cover the intake-opening 12a of the outer casing 12 of the light source apparatus 500. In this case, although the light source apparatus 500 is increased in outer dimensions and the cooling effect of the light source member is deteriorated, it is possible to further restrain light from the light source member from leaking outside of the light source apparatus 500, and this is extremely effective because it is possible to restrain light from leaking outside of the light source apparatus 500.

The comparison-object light source apparatus 900 may be disposed above or below the light source apparatus 500, and the light source apparatus 500 and the comparison-object light source apparatus 900 may be stacked on each other and may be used.

While the invention has been shown and described in detail, the foregoing description is in all aspects illustrative and not restrictive. It is therefore understood that numerous modifications and variations can be devised without departing from the scope of the invention.

What is claimed is:

1. A light source apparatus comprising:
   an outer casing;
   at least one light source module which is disposed in said outer casing and which includes a light source member and a cooling body for cooling said light source member; and
   a wind tunnel which is disposed in said outer casing, which surrounds said cooling body of said at least one light source module, and which includes a first wind passage which allows cooling wind to pass through said cooling body of said at least one light source module, and
   a duct disposed in said outer casing
   wherein
   an intake-opening through which cooling wind is taken into said outer casing from outside thereof is formed in a surface of said outer casing, and
   one end of said first wind passage of said wind tunnel is connected to said intake-opening and the other end of said wind passage connected to said duct.

2. The light source apparatus according to claim 1, wherein a peripheral edge of said one end of said first wind passage surrounds said intake-opening.

3. The light source apparatus according to claim 2, wherein said wind tunnel includes a flange portion on said peripheral edge of said one end of said first wind passage.

4. The light source apparatus according to claim 1, further comprising
   a duct disposed in said outer casing, wherein
   a discharge opening through which cooling wind passing through said cooling body of said at least one light source module is discharged outside of said outer casing is formed in said surface of said outer casing,
   a connection opening through which a second wind passage possessed by said duct and said first wind passage of said wind tunnel are connected to each other is formed in a surface of said duct,
   the other end of said first wind passage of said wind tunnel is connected to said connection opening of said duct, and
   one end of said second wind passage of said duct is connected to said discharge opening of said outer casing.

5. The light source apparatus according to claim 4, wherein a peripheral edge of the other end of said first wind passage surrounds said connection opening.

6. The light source apparatus according to claim 5, wherein said wind tunnel includes a flange portion on a peripheral edge of the other end of said first wind passage.

7. The light source apparatus according to claim 1, wherein said at least one light source module includes a plurality of light source modules which are connected to each other through a connection member, and
   cooling bodies of said plurality of light source modules are disposed in series in a moving direction of cooling wind in said first wind passage of said wind tunnel.

8. The light source apparatus according to claim 1, wherein said at least one light source module includes first and second light source modules which are connected to each other through a connection member, first and second plate members constituting a portion of said wind tunnel are respectively mounted on said first and second light source modules, said connection member connects said first and second light source modules to each other, and said connection member constitutes a portion of said wind tunnel except said portion thereof constituted by said first and second plate members.

9. The light source apparatus according to claim 8, wherein said first and second plate members have the same structures.

10. The light source apparatus according to claim 9, wherein said wind tunnel includes a first upper plate portion existing over both said first and second light source modules, and first and second side plate portions which exist over both said first and second light source modules and which are opposed to each other, said connection member includes a second upper plate portion constituting said first upper plate portion of said wind tunnel, and a third side plate portion constituting one of said first and second side plate portions of said wind tunnel, said first and second plate members respectively include fourth and fifth side plate portions constituting the other one of said first and second side plate portions of said wind tunnel, flange portions are respectively provided on both end surfaces, in a direction in which said first and second light source modules are arranged, of said fourth side plate portion in said first plate member, flange portions are respectively provided on both end surfaces, in the direction in which said first and second light source modules are arranged, of said fifth side plate portion in said second plate member, flange portions are respectively provided on both end surfaces, in the direction in which said first and second light source modules are arranged, of said second upper plate portion in said connection member, and flange portions are respectively provided on both end surfaces, in the direction in which said first and second light source modules are arranged, of said third side plate portion in said connection member.

11. The light source apparatus according to claim 8, wherein a first substrate on which a drive circuit for driving a light source member of said first light source module is formed is mounted on said first plate member, and a second substrate on which a drive circuit for driving a light source member of said second light source module is formed is mounted on said second plate member.

12. The light source apparatus according to claim 11, wherein said first and second plate members are mounted on said cooling bodies of said first and second light source modules, respectively, said first substrate is mounted on said first plate member such that a first thermal conduction member is interposed therebetween, and said second substrate is mounted on said second plate member such that a second thermal conduction member is interposed therebetween.

\* \* \* \* \*